(12) United States Patent
Seo et al.

(10) Patent No.: US 12,504,606 B2
(45) Date of Patent: Dec. 23, 2025

(54) LENS ASSEMBLY AND ELECTRONIC APPARATUS INCLUDING THE SAME

(71) Applicant: Samsung Electronics Co., Ltd., Gyeonggi-do (KR)

(72) Inventors: Jungpa Seo, Gyeonggi-do (KR); Yongjae Lee, Gyeonggi-do (KR); Jeongyeol Lee, Gyeonggi-do (KR); Min Heu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 17/567,338

(22) Filed: Jan. 3, 2022

(65) Prior Publication Data
US 2022/0214526 A1 Jul. 7, 2022

Related U.S. Application Data

(63) Continuation of application No. PCT/KR2021/018239, filed on Dec. 3, 2021.

(30) Foreign Application Priority Data

Jan. 4, 2021 (KR) .................. 10-2021-0000449

(51) Int. Cl.
*G02B 13/00* (2006.01)
*G02B 1/04* (2006.01)
(Continued)

(52) U.S. Cl.
CPC ......... *G02B 13/0045* (2013.01); *G02B 1/041* (2013.01); *G02B 3/04* (2013.01); *G02B 9/60* (2013.01)

(58) Field of Classification Search
CPC .. G02B 13/00; G02B 13/004; G02B 13/0045; G02B 13/0065; G02B 1/04; G02B 1/041;
(Continued)

(56) References Cited

U.S. PATENT DOCUMENTS 3,942,876 A * 3/1976 Betensky ................. G02B 9/62
359/823
4,062,630 A * 12/1977 Matsui ................... G02B 13/02
359/747
(Continued)

FOREIGN PATENT DOCUMENTS

CN     111007620 A     4/2020
JP    2003-107355 A    4/2003
(Continued)

OTHER PUBLICATIONS

Muhammad Nadeem Akram, A Design Study of Dual-field-of-view Imaging Systems for the 35 m Waveband Utilizing Focal-place Arrays, 5 Journal of Optics a Pure and Applied Optics 308-322 (2003). (Year: 2003).*
(Continued)

*Primary Examiner* — Michael H Caley
(74) *Attorney, Agent, or Firm* — Cha & Reiter, LLC

(57) ABSTRACT

Provided are a lens assembly and an electronic apparatus including the same. The lens assembly may include four or more lenses arranged from an object side to an image side where an image sensor is located. The lens assembly may further include a first lens arranged closest to the object side, having positive refractive power, including an object-side surface convex toward the object side, and being an aspherical lens, a last lens arranged closest to the image side, and two or more plastic aspherical lenses disposed between the first lens and the last lens. Various other embodiments thereof may also be possible and at least some of which are disclosed.

16 Claims, 18 Drawing Sheets

(51) Int. Cl.
*G02B 3/04* (2006.01)
*G02B 9/60* (2006.01)

(58) Field of Classification Search
CPC .......... G02B 3/04; G02B 3/0087; G02B 9/34; G02B 9/60; G02B 2003/0093; G03B 17/12; G03B 30/00; H04N 23/00
See application file for complete search history.

(56) References Cited

U.S. PATENT DOCUMENTS

| | | | | |
|---|---|---|---|---|
| 4,493,536 | A * | 1/1985 | Kudo | G02B 13/04 |
| | | | | 359/753 |
| 4,666,259 | A * | 5/1987 | Iizuka | G02B 17/0884 |
| | | | | 359/731 |
| 8,563,929 | B2 * | 10/2013 | Vizgaitis | G02B 23/12 |
| | | | | 250/332 |
| 8,810,922 | B2 * | 8/2014 | Engelhardt | G02B 9/60 |
| | | | | 359/764 |
| 9,223,118 | B2 * | 12/2015 | Mercado | H04N 23/00 |
| 9,316,810 | B2 | 4/2016 | Mercado | |
| 10,139,601 | B2 | 11/2018 | Choi et al. | |
| 10,254,513 | B2 * | 4/2019 | Huang | G02B 13/0045 |
| 10,746,966 | B2 | 8/2020 | Tabata | |
| 10,809,491 | B2 * | 10/2020 | Jeong | H04N 23/55 |
| 2003/0107823 | A1 | 6/2003 | Sekiyama et al. | |
| 2011/0026132 | A1 | 2/2011 | Sado | |
| 2015/0168677 | A1 | 6/2015 | Lee et al. | |
| 2017/0199356 | A1 * | 7/2017 | Iwamoto | G02B 13/02 |
| 2017/0353645 | A1 * | 12/2017 | Shabtay | G02B 13/0045 |
| 2018/0081149 | A1 * | 3/2018 | Bae | G02B 7/021 |
| 2018/0267271 | A1 * | 9/2018 | Tseng | H04M 1/0264 |
| 2018/0307006 | A1 * | 10/2018 | Kang | H04N 23/54 |
| 2019/0082114 | A1 * | 3/2019 | Jeon | H04N 23/698 |
| 2019/0196148 | A1 | 6/2019 | Yao et al. | |
| 2019/0377158 | A1 * | 12/2019 | Liao | G02B 9/60 |
| 2020/0326505 | A1 * | 10/2020 | Okuoka | G02B 9/34 |
| 2020/0341288 | A1 * | 10/2020 | Mizuma | G03B 3/00 |
| 2020/0371313 | A1 | 11/2020 | Shih et al. | |
| 2021/0026117 | A1 * | 1/2021 | Yao | G02B 13/004 |
| 2021/0048630 | A1 * | 2/2021 | Liao | G02B 13/0045 |
| 2021/0157095 | A1 | 5/2021 | Chen et al. | |
| 2021/0208374 | A1 * | 7/2021 | Kuribayashi | G02B 15/1451 |
| 2021/0356712 | A1 | 11/2021 | Lee et al. | |
| 2022/0155653 | A1 * | 5/2022 | Matsuba | G02B 27/0068 |
| 2022/0187578 | A1 * | 6/2022 | Yeh | G02B 13/0045 |
| 2022/0373769 | A1 | 11/2022 | Jeong et al. | |
| 2022/0390710 | A1 * | 12/2022 | Chuang | G02B 9/62 |

FOREIGN PATENT DOCUMENTS

| | | |
|---|---|---|
| JP | 2011-33657 A | 2/2011 |
| JP | 2011/102838 A | 5/2011 |
| JP | 2019/35828 A | 3/2019 |
| JP | 2020/71438 A | 5/2020 |
| KR | 10-2019-0035634 A | 4/2019 |
| KR | 10-2020-0022308 A | 3/2020 |
| KR | 10-2180476 B1 | 11/2020 |
| KR | 10/2020/0145396 A | 12/2020 |
| TW | I685675 B | 2/2020 |
| WO | WO-2017172794 A1 * | 10/2017 ........... G02B 13/004 |

OTHER PUBLICATIONS

Herbert Gross (ed.), Handbook of Optical Systems, vol. 3, 377-379 (2007). (Year: 2007).*
DIY Camera Lens Tutorial, 2009, pp. 1-39 [online], [retrieved Jun. 9, 2024], retrieved from the Internet <URL: https://www.flickr.com/groups/28242726@N00/discuss/72157622612617105/>. (Year: 2009).*
Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*
Dan Carr, 2017, pp. 1-85 [online], [retrieved Jun. 16, 2024], retrieved from the Internet <URL: https://shuttermuse.com/angle-of-view-vs-field-of-view-fov-aov/>. (Year: 2017).*
Machine English Translation of KR 10-2019-0035634 A obtained from Patent Translate, 2024, filed with KR 10-2019-0035634 A. (Year: 2024).*
Easier English Student Dictionary 911 (2003). (Year: 2003).*
Apirat Prasit et al., Installation, Alignment and Preliminary performance of the Thai National Telescope Focal Reducer, 11116 Proceedings of SPIE 111161A-1 to 111161A-13 (2019). (Year: 2019).*
Wubin Pang et al., Distributed Focus and Digital Zoom, 2019, pp. 1-17 [online], [retrieved Dec. 2, 2024], retrieved from the Internet <URL: https://arxiv.org/pdf/1909.06451>. (Year: 2019).*
Chengliang Wang et al., Power Allocation for Varifocal Lens of Two Groups, 4927 Proceedings of SPIE 656-659 (2002). (Year: 2002).*
Simon Thibault et al., Consumer Electronic Optics: How Small a Lens Can Be? The Case of Panomorph Lenses, 9192 Proceedings of SPIE 91920H-1 to 91920H-7 (2014). (Year: 2014).*
Tanya Puntti, How to Use a Telephoto Zoom Lens, 2017, pp. 1-4 [online], [retrieved Mar. 4, 2025], retrieved from the Internet <URL: https://web.archive.org/web/20170210213508/https://www.slrphotographyguide.com/how-to-use-telephoto-zoom-lens/>. (Year: 2017).*
Harry Guinness, What is a Telephoto Lens?, 2017, pp. 1-12 [online], [retrieved Mar. 5, 2025], retrieved from the Internet <URL: https://www.howtogeek.com/309838/what-is-a-telephoto-lens/>. (Year: 2017).*
Mortimer Abramowitz et al., Introduction to Lenses and Geometrical Optics, 2018, pp. 1-8 [online], [retrieved Apr. 20, 2023], retrieved from the Internet <URL: https://micro.magnet.fsu.edu/primer/lightandcolor/lensesintro.html>. (Year: 2018).*
Focal Length and Angle of View, 2019, pp. 1-4 [online], [retrieved Mar. 4, 2025], retrieved from the Internet <URL: https://web.archive.org/web/20190303005639/https://www.ricoh-imaging.co.jp/english/r_dc/photostyle/knowledge/preparation/lens.html>. (Year: 2019).*
International Search Report dated Mar. 15, 2022.
Extended European Search Report dated Apr. 16, 2024.
Korean Office Action dated Jul. 11, 2025.

* cited by examiner

LENS ASSEMBLY AND ELECTRONIC APPARATUS INCLUDING THE SAME

CROSS REFERENCE TO RELATED APPLICATION(S)

This application is a Continuation of and based on and claims priority under 35 U.S.C. § 120 to PCT International Application No. PCT/KR2021/018239, which was filed on Dec. 3, 2021, and claims priority to Korean Patent Application No. 10-2021-0000449, filed on Jan. 4, 2021, in the Korean Intellectual Property Office, the disclosures of which are incorporated by reference herein their entirety.

TECHNICAL FIELD

One or more embodiments of the instant disclosure generally relate to a lens assembly and an electronic apparatus including the same, for example, to a miniaturized lens assembly and an electronic apparatus including the same.

BACKGROUND ART

Services and functions provided by electronic apparatuses have been expanding gradually. Electronic apparatuses such as mobile devices or user devices may provide various services through various sensor modules. Electronic apparatuses may provide multimedia services such as photo (or picture) services or video (or moving image) services. As the use of electronic apparatuses has increased, the use of cameras of the electronic apparatuses has also gradually increased. For example, performances and/or resolutions of cameras of electronic apparatuses have improved based on user demand. Cameras of electronic apparatuses may be used to take various types of pictures such as landscape pictures, portrait pictures, or selfies. Multimedia files such as pictures or moving images (e.g. videos) may be shared via social networks or other media.

An electronic apparatus may be mounted with a plurality of optical devices to improve the quality of the captured image and to provide various visual effects to a captured image. For example, an object image may be obtained through a plurality of cameras (e.g., a telephoto camera and a wide-angle camera) having different optical characteristics and the raw image data from multiple cameras may be synthesized to obtain a captured image. Such an optical device, i.e., one that includes a plurality of cameras, may be mounted on an electronic apparatus such as a digital camera specialized for photography and may also be mounted on a miniaturized electronic apparatus such as a portable mobile communication terminal.

As the rate of utilization of imaging devices in portable apparatuses has increased, there is an increasing demand for miniaturization of such imaging devices. However, aberration control may be difficult due to the miniaturization of the lens assembly. In the case of a telephoto lens in a compact electronic device, because it is difficult to sufficiently realize the performance of the optical system, it may be difficult to realize a half viewing angle of 15 degrees or less.

SUMMARY

In order to solve the above or other problems, according to an embodiment of the disclosure, a lens assembly including four or more lenses arranged from an object side to an image side where an image sensor is located includes: a first lens arranged closest to the object side, having positive refractive power, including an object-side surface convex toward the object side, and being an aspherical lens; a last lens arranged closest to the image side; and two or more plastic aspherical lenses disposed between the first lens and the last lens, where the lens assembly satisfies a following expression:

$$FOV < 8 \text{ (degree)} \qquad \text{<Expression>}$$

where FOV denotes a half viewing angle of the lens assembly.

In order to solve the above or other problems, according to another embodiment of the disclosure, an electronic apparatus includes: a lens assembly including four or more lenses arranged from an object side to an image side where an image sensor is located; at least one camera configured to obtain information about an object from light incident through the lens assembly; and an image signal processor configured to process an image of the object based on the information, wherein the lens assembly includes a first lens arranged closest to the object side, having positive refractive power, including an object-side surface convex toward the object side, and being an aspherical lens, a last lens arranged closest to the image side, and two or more plastic aspherical lenses disposed between the first lens and the last lens, where the lens assembly satisfies a following expression:

$$FOV < 8 \text{ (degree)} \qquad \text{<Expression>}$$

where FOV denotes a half viewing angle of the lens assembly.

Certain embodiments of the disclosure may provide, for example, a compact lens assembly for use in an electronic apparatus (e.g., a portable terminal).

Also, certain embodiments of the disclosure may provide, for example, an electronic apparatus including the disclosed compact lens assembly.

The lens assembly according to certain embodiments of the disclosure may implement, for example, a compact telephoto optical system. Also, the lens assembly according to certain embodiments of the disclosure may perform focusing, and the entire lens included in the lens assembly may move together during focusing. The lens assembly according to certain embodiments of the disclosure may suitably distribute the refractive power of the lenses to facilitate aberration correction. Also, the electronic apparatus including the lens assembly according to certain embodiments of the disclosure may be compact and may capture multimedia (e.g., pictures or videos) with high performance. Also, the lens assembly according to certain embodiments of the disclosure may include a reflection member and may perform focusing by using the reflection member.

In addition, various other effects may also be directly or indirectly understood and provided through the disclosure.

DETAILED DESCRIPTION

Figure 1:
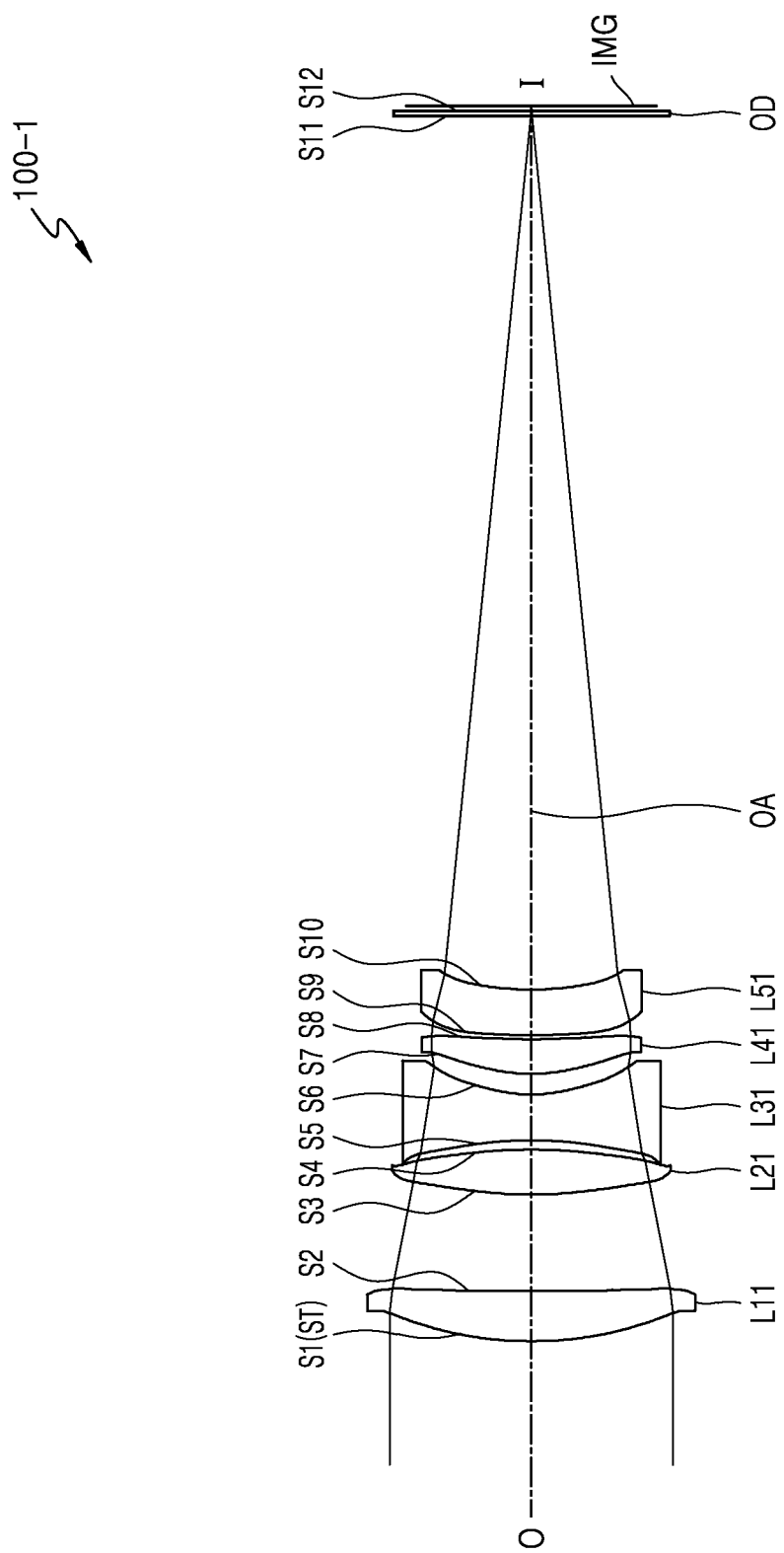
FIG. 1 illustrates a lens assembly of a first numerical embodiment of the disclosure.

Hereinafter, certain embodiments of the disclosure will be described with reference to the accompanying drawings. However, it should be understood that the disclosure is not limited to particular embodiments but also includes various modifications, equivalents, and/or alternatives thereof. Throughout the disclosure and drawings, like reference numerals may be used to denote like elements.

Electronic apparatuses according to certain embodiments of the disclosure may include various types of apparatuses. The electronic apparatuses may include, for example, portable communication apparatuses (e.g., smart phones), computer apparatuses, portable multimedia apparatuses, portable medical devices, cameras, wearable apparatuses, or home appliances. The electronic apparatuses according to embodiment of the disclosure are not limited to the above devices.

Certain embodiments of the disclosure and terms used herein are not intended to limit the technical features described herein to particular embodiments, and the disclosure should be understood as including various modifications, equivalents, or alternatives of the embodiments of the disclosure. Throughout the disclosure and drawings, like reference numerals may be used to denote like or relevant elements. The singular form of a noun corresponding to an item may include the item or a plurality of items unless the relevant context clearly indicates otherwise. As used herein, each of the phrases "A or B," "at least one of A and B," "at least one of A or B," "A, B, or C," "at least one of A, B, and C," and "at least one of A, B, or C" may include any one of the items listed together in the phrase or any combinations thereof. Terms such as "first" and "second" may be merely used to distinguish an element from other elements and are not intended to limit the elements in other aspects (e.g., importance or order). When a certain (e.g., first) element is referred to as being "coupled" or "connected" to another (e.g., second) element with or without the term "functionally" or "communicatively," it may mean that the certain element may be connected to the other element directly (e.g., by wire), wirelessly, or through a third element.

The term "module" used herein may include a unit implemented as hardware, software, or firmware and may be interchangeable with, for example, terms such as "logic," "logical block," "component," or "circuit". The "module" may be an integrated component or a portion or a minimum unit of the integrated component that performs one or more functions. For example, according to an embodiment of the disclosure, the module may be implemented in the form of an application-specific integrated circuit (ASIC).

Figure 17:
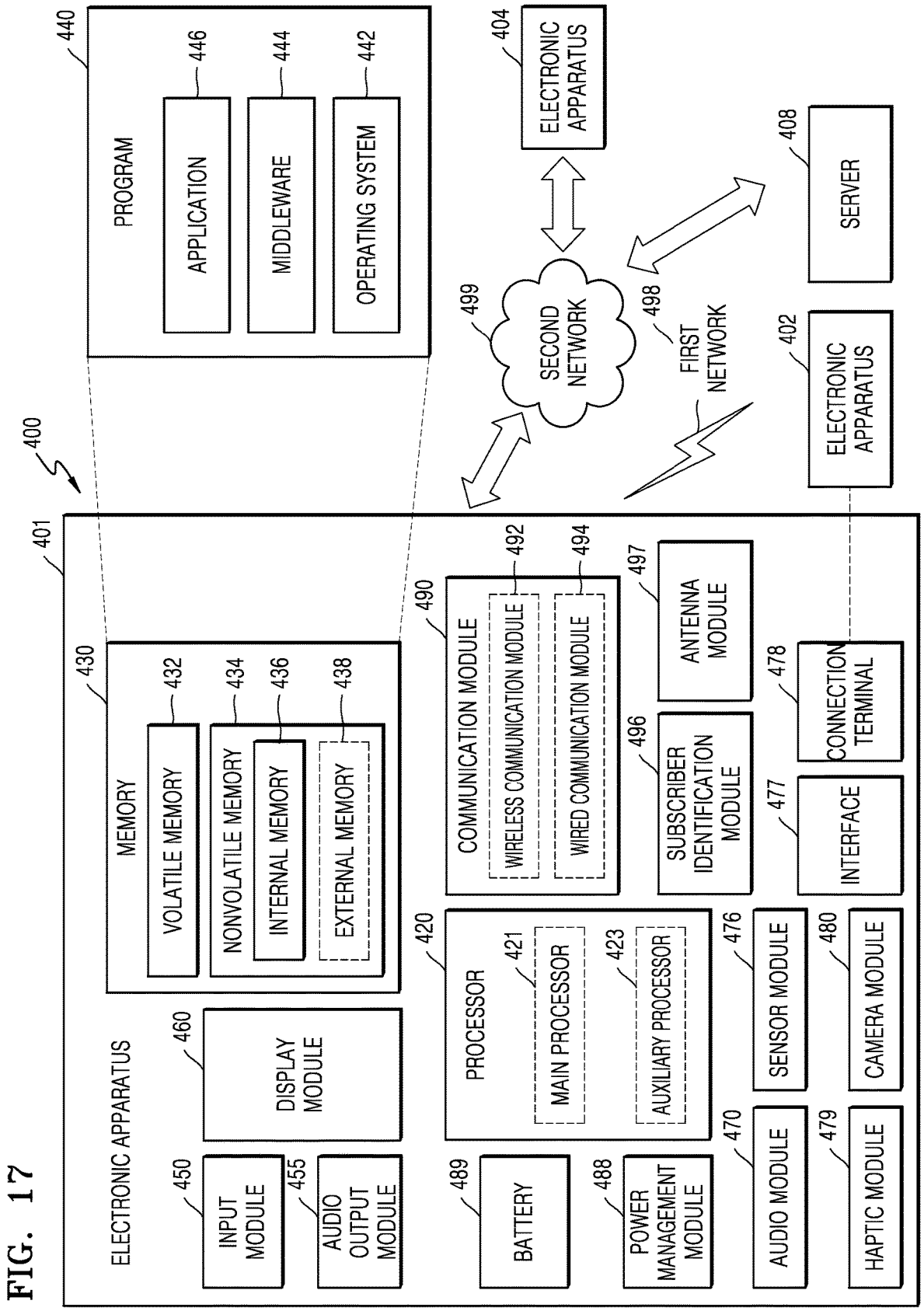
FIG. 17 is a block diagram of an electronic apparatus in a network environment according to an embodiment of the disclosure.
Figure 18:
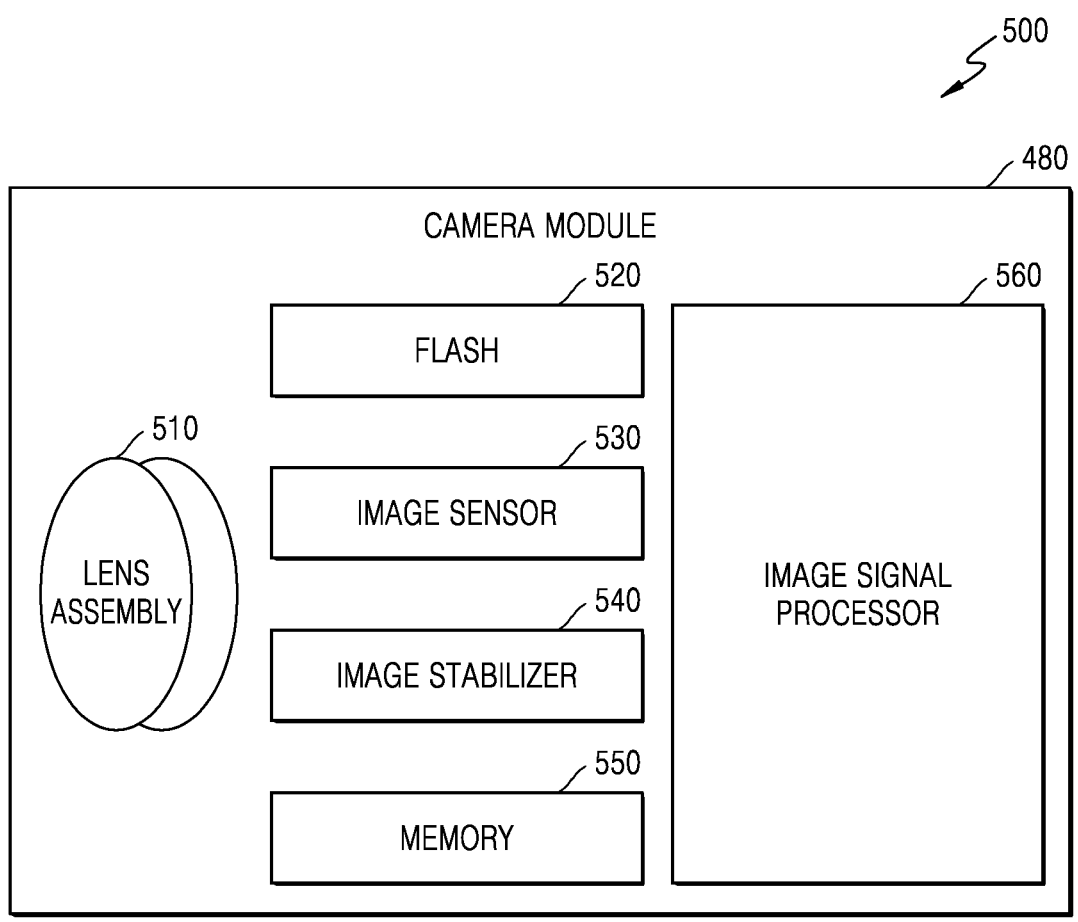
FIG. 18 is a block diagram of a camera module in an electronic apparatus according to an embodiment of the disclosure.

Referring to FIGS. 17 and 18, various embodiments of the disclosure may be implemented as a storage medium (e.g., an internal memory 436) readable by a machine (e.g., an electronic apparatus 401) or may be implemented as software (e.g., a program 440) including one or more instructions stored in an external memory 438. For example, the machine (e.g., a processor (e.g., processor 420) of the electronic apparatus 401) may call and execute at least one of one or more stored instructions from the storage medium. This may enable the machine to be operated to perform at least one function according to the called at least one instruction. The one or more instructions may include code generated by a compiler or code executable by an interpreter. The machine-readable storage medium may be provided in the form of a non-transitory storage medium. Here, the term "non-transitory" may mean that the storage medium is a tangible apparatus and does not include signals (e.g., electromagnetic waves), and may mean that data may be permanently or temporarily stored in the storage medium.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user apparatuses. In the case of online distribution, at least a portion of the computer program product may be at least temporarily stored or temporarily generated in a machine-readable storage medium such as a manufacturer's server, a server of an application store, or a memory of a relay server.

According to certain embodiments of the disclosure, each element (e.g., module or program) of the above elements may include a single entity or a plurality of entities, and some of the plurality of entities may be separately arranged in another element. According to certain embodiments of the disclosure, one or more elements or operations among the above elements may be omitted, or one or more other elements or operations may be added. Alternatively or additionally, a plurality of elements (e.g., modules or programs) may be integrated into one element. In this case, the integrated element may perform one or more functions of each element of the plurality of elements in the same or similar manner as those performed by the corresponding element among the plurality of elements prior to the integration. According to certain embodiments of the disclosure, operations performed by modules, programs, or other elements may be executed sequentially, parallel, iteratively, or heuristically; one or more of the operations may be executed in different order; or one or more other operations may be added therein. As used herein, the term "user" may refer to a person using the electronic apparatus, or an apparatus (e.g., an artificial intelligence electronic apparatus) using the electronic apparatus.

Hereinafter, lens assemblies and apparatuses including the same according to certain embodiments of the disclosure will be described in detail with reference to the accompanying drawings.

FIG. 1 illustrates a lens assembly 100-1 of a first numerical embodiment of the disclosure.

The lens assembly 100-1 according to an embodiment of the disclosure may include a first lens L11 having positive refractive power and a fifth lens L51 arranged closest to an image side I. The first lens L11 and the fifth lens L51 are arranged from an object side O to the image side I. A second lens L21, a third lens L31, and a fourth lens L41 may be arranged between the first lens L11 and the fifth lens L51.

Hereinafter, for describing the configuration of each lens, for example, the image side may refer to a side facing an image plane IMG where an image is formed, and the object side may refer to a side facing an object whose image is to be captured. Also, the "object-side surface" of the lens may refer to, for example, a left-side surface as shown in the figures where light enters with respect to an optical axis OA, that is, a lens surface on the side where the object is located with respect to the optical axis OA. Conversely, the "image-side surface" thereof may refer to a right-side surface as shown in the figures where light exits with respect to the optical axis OA, that is, a lens surface on the side where the image plane IMG is located with respect to the optical axis OA. The image plane IMG may be, for example, an imaging device surface or an image sensor surface. An image sensor may include, for example, a sensor such as a complementary metal oxide semiconductor (CMOS) or a charge-coupled device (CCD). The image sensor is not limited thereto and may be, for example, any device that is configured to convert an image of the object into an electrical image signal. With respect to the object-side surfaces and the image-side surfaces of the lenses, reference numerals of S1, S2, S3, . . . , Sn (n is a natural number) are respectively assigned sequentially from the object side O to the image side I along the optical axis OA.

According to an embodiment of the disclosure, the first lens L11 may include an object-side surface S1 convex toward the object side O and may be an aspherical lens. The first lens L11 may be, for example, a meniscus lens convex toward the object side O. At least two or more plastic aspherical lenses may be arranged between the first lens L11 and the image plane IMG. For example, the second lens L21, the third lens L31, and the fourth lens L41 may be plastic aspherical lenses. In the present embodiment, the first lens L11 and the fifth lens L51 may also be plastic aspherical lenses. The second lens L21 may have, for example, positive refractive power, and the third lens L31 may have, for example, negative refractive power. The second lens L21 may be a biconvex lens, and the third lens L31 may be a biconcave lens.

According to an embodiment of the disclosure, the fourth lens L41 may have positive refractive power and may include, for example, an object-side surface S7 convex toward the object side O. The fourth lens L41 may be a meniscus lens convex toward the object side O. The fifth lens L51 may have positive refractive power or negative refractive power. The fifth lens L51 may be a meniscus lens convex toward the object side O.

According to an embodiment of the disclosure, all of the lenses included in the lens assembly 100-1 may move together such that the distance between the first lens L11 and the fifth lens L51 closest to the image side is not changed during focusing.

According to an embodiment of the disclosure, a stop ST may be arranged at the object side O of the first lens L11. For example, the stop ST may be arranged at the object-side surface S1 of the first lens L11. The stop ST may be configured to adjust the diameter of light beams entering the lens assembly and may include, for example, an aperture stop, a variable stop, and a mask-type stop.

According to an embodiment of the disclosure, at least one optical device OD may be arranged between the fifth lens L51 and the image plane IMG. The optical device OD may include, for example, at least one of a low-pass filter, an infrared (IR)-cut filter, or a cover glass. For example, when an IR-cut filter is arranged as an optical device, visible rays may be transmitted and IR rays may be reflected back to the outside of the lens assembly such that the IR rays may not be transmitted to an image plane. However, the lens assembly may not include the shown optical device OD.

A telephoto picture may be taken by using the lens assembly according to certain embodiments of the disclosure. The lens assembly according to certain embodiments of the disclosure may be installed in a mobile apparatus such as a mobile phone or a digital camera. Also, the lens assembly according to certain embodiments of the disclosure may be applied to other types of devices such as a surveillance camera, a vehicle camera, augmented reality (AR) glasses, virtual reality (VR) glasses, an action cam, or the like.

Figure 2:
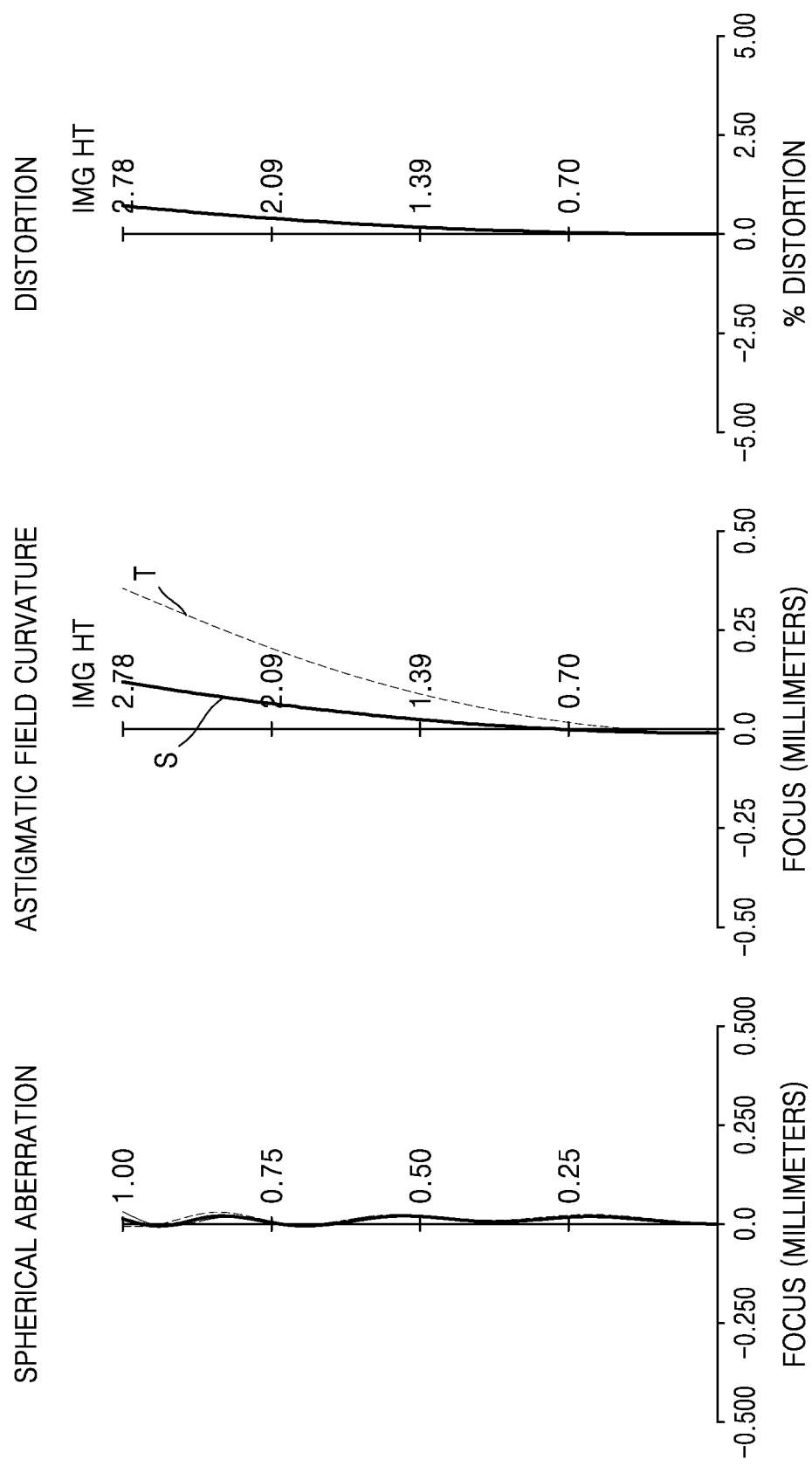
FIG. 2 illustrates a longitudinal spherical aberration, an astigmatic field curvature, and a distortion aberration (or distortion) of the optical lens assembly according to the first numerical embodiment.

FIG. 2 illustrates a longitudinal spherical aberration, an astigmatic field curvature, and a distortion aberration (or distortion) of the optical lens assembly according to the first numerical embodiment. The longitudinal spherical aberration may represent, for example, light at wavelengths of 656.2700 nanometers (nm), 587.5600 nm, and 546.0700 nm respectively, and the astigmatic field curvature may include a tangential field curvature T and a sagittal field curvature S. The astigmatic field curvature may represent light with wavelength of 587.5600 nm, and the distortion aberration may represent light with wavelength of 587.5600 nm.

Figure 3:
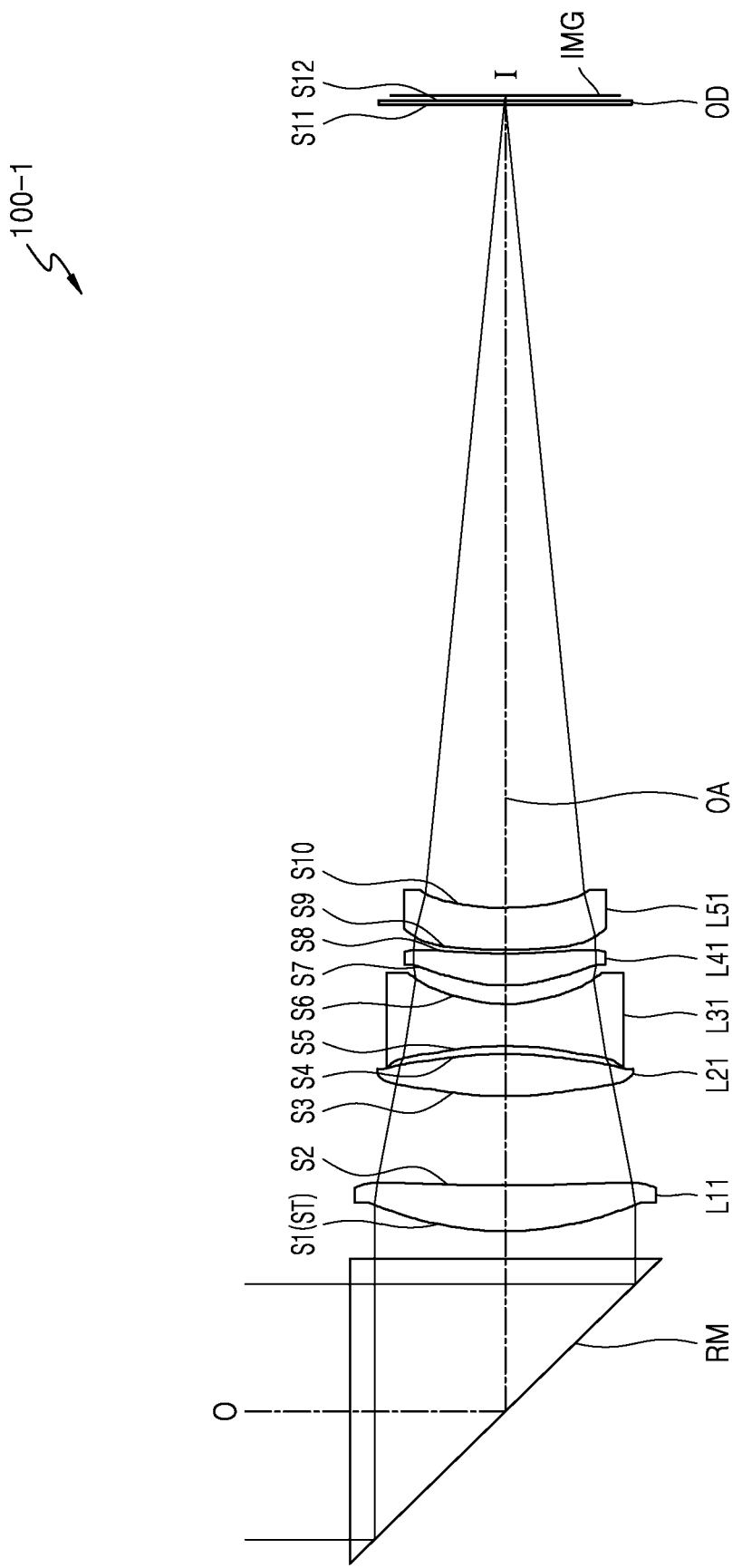
FIG. 3 illustrates an example in which an optical path is bent when the lens assembly of the first numerical embodiment illustrated in FIG. 1 includes one reflection member.

FIG. 3 illustrates an example in which the lens assembly 100-1 illustrated in FIG. 1 further includes a reflection member RM. In FIG. 3, redundant descriptions of the elements using the same reference numerals as those in FIG. 1 will be omitted for conciseness. The reflection member RM may be arranged at the object side O of the first lens L11. The reflection member RM may include, for example, a reflection mirror or a prism. When the lens assembly 100-1 is applied in an electronic apparatus with the reflection member RM, the degree of freedom in the arrangement of the lens assembly 100-1 may be increased. The path of light entering from the object may be bent by the reflection member RM. When the reflection member RM is arranged as illustrated in FIG. 3, the object side O may refer to the side where the object would be if the light path bent by the reflection member RM is straightened. In the present embodiment, during focusing, all of the first lens L11, the second lens L21, the third lens L31, the fourth lens L41, and the fifth lens L51 may move or only the reflection member RM may move.

Figure 4:
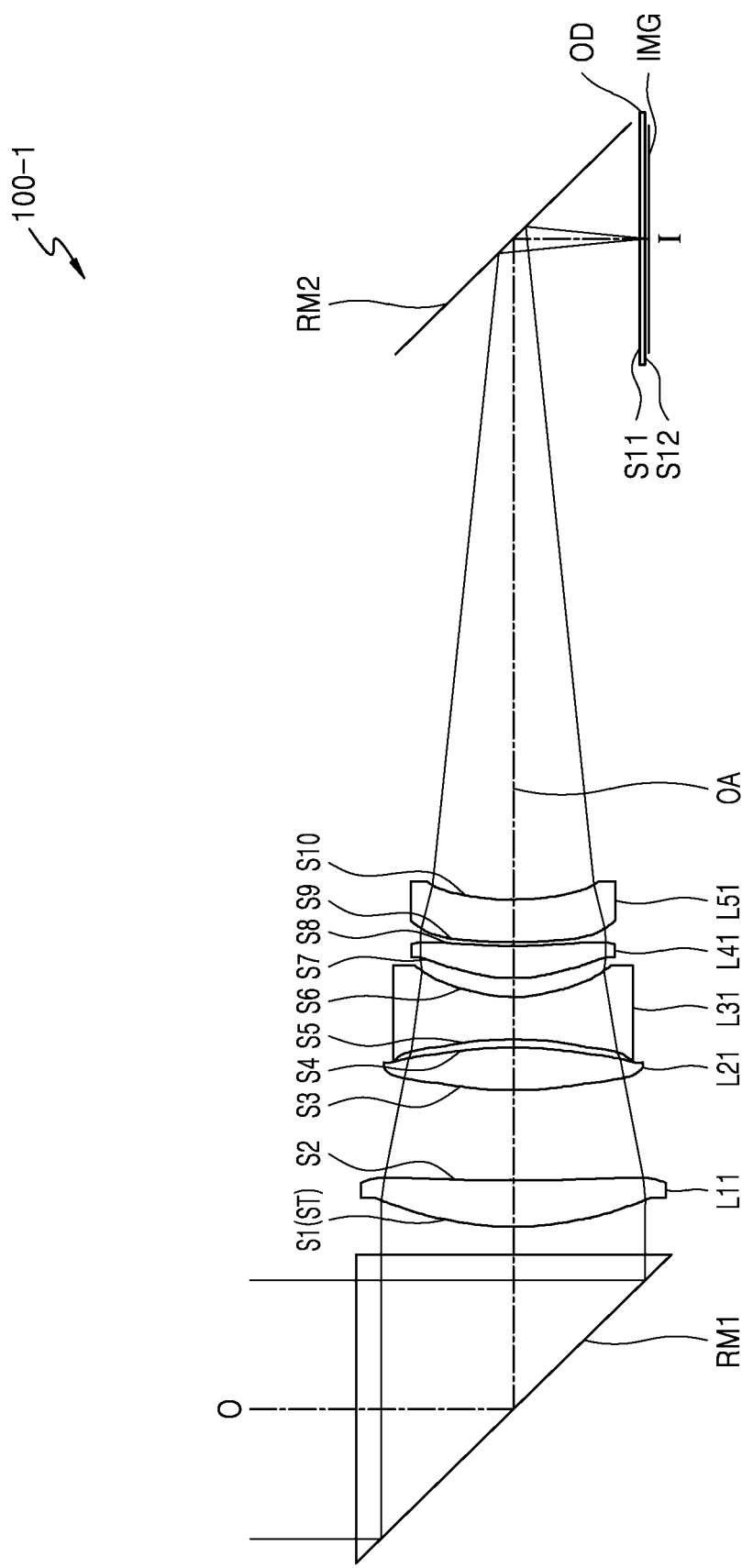
FIG. 4 illustrates an example in which an optical path is bent when the lens assembly of the first numerical embodiment illustrated in FIG. 1 includes two reflection members.

FIG. 4 illustrates an example in which the lens assembly 100-1 illustrated in FIG. 1 further includes two reflection members RM1 and RM2. The first reflection member RM1 may be arranged at the object side O of the first lens L11, and a second reflection member RM2 may be arranged between the fifth lens L51 and the image plane IMG. Due to the first reflection member RM1 and the second reflection member RM2, the direction in which light enters the lens assembly and the direction in which light exits the lens assembly may be substantially parallel to each other, that is, sufficiently parallel so that an image of the object can be adequately captured, and when the lens assembly is used in a mobile phone, the lenses may be arranged in the horizontal direction or the vertical direction of the mobile phone rather than the thickness direction of the mobile phone. In this case, the degree of freedom for freely arranging the lenses in a thin mobile phone may be increased.

The lens assembly according to an embodiment of the disclosure may satisfy the following expression. The following expressions will be described with reference to the lens assembly 100-1 according to the first numerical embodiment illustrated in FIG. 1. However, the following expressions may also be similarly applied to other embodiments of the disclosure.

$$FOV<8 \text{ (degree)} \qquad <\text{Expression 1}>$$

Here, FOV denotes a half viewing angle of the lens assembly.

The lens assembly 100-1 may have a half viewing angle smaller than 8 degrees while satisfactorily correcting for optical aberration. Accordingly, the lens assembly 100-1 may implement a compact telephoto lens.

The lens assembly according to an embodiment of the disclosure may satisfy the following expression.

$$0.7<(L/FOV)<3.4 \qquad <\text{Expression 2}>$$

Here, L denotes the distance from the object-side surface of the first lens to the image-side surface of the last lens arranged closest to the image side. In the first numerical embodiment, it may denote, for example, the distance from the object-side surface S1 of the first lens L11 to the image-side surface S10 of the fifth lens L51 along the optical axis.

When (L/FOV) is 0.7 or less, it may be difficult to correct the optical aberration with respect to the viewing angle, and when (L/FOV) is 3.4 or more, the optical performance thereof may be improved but it may be difficult to miniaturize the lens assembly.

The lens assembly according to an embodiment of the disclosure may satisfy the following expression.

$$L1R1/EFL<0.4 \qquad <\text{Expression 3}>$$

Here, L1R1 denotes a curvature radius (radius of curvature) of the object-side surface of the first lens, and EFL denotes a focal length (focal distance) of the lens assembly.

Expression 3 defines the ratio of the curvature radius of the object-side surface S1 of the first lens L11 closest to the object to the focal length of the lens assembly.

When (L1R1/EFL) is 0.4 or more, because the curvature radius of the first lens may be too large compared to the focal length, it may be difficult to correct the spherical aberration and the astigmatism of the lens assembly and thus the optical performance thereof may be degraded.

For example, the lens assembly according to an embodiment of the disclosure may satisfy the following expression.

$$2<(BFL/FOV)<7 \qquad <\text{Expression 4}>$$

Here, BFL denotes a back focal length of the lens assembly. The back focal length may denote the distance from the image-side surface of the fifth lens L51 to the image plane.

When (BFUFOV) is 7 or more, the size of the lens assembly 100-1 may increase and thus miniaturization may be difficult, and when (BFL/FOV) is 2 or less, the sensitivity of the lens assembly 100-1 may increase and thus picture quality thereof may be degraded.

Figure 5:
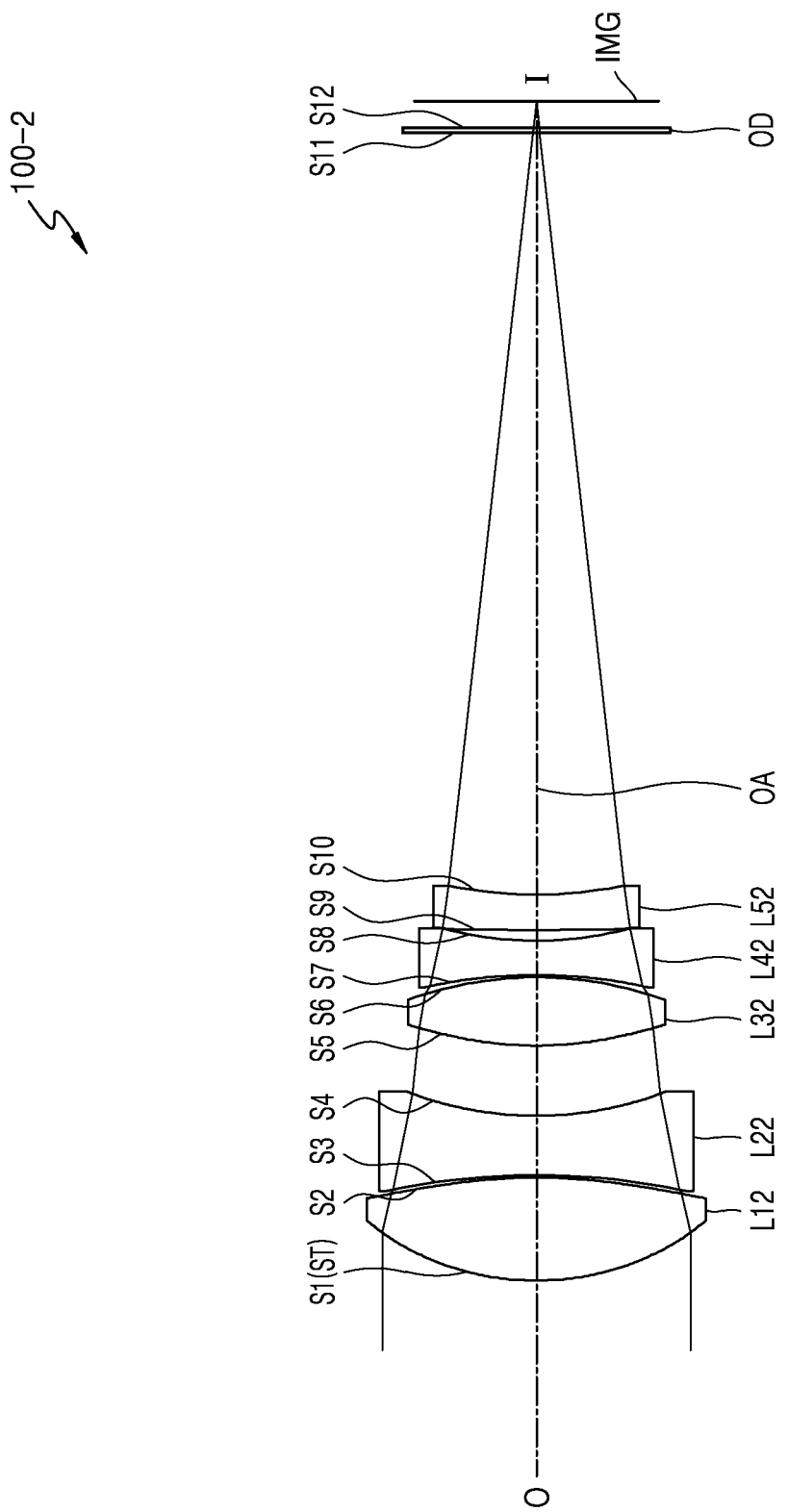
FIG. 5 illustrates a lens assembly of a second numerical embodiment of the disclosure.

FIG. 5 illustrates a lens assembly of a second numerical embodiment of the disclosure.

According to an embodiment of the disclosure, a lens assembly 100-2 may include a first lens L12, a second lens L22, a third lens L32, a fourth lens L42, and a fifth lens L52 arranged from an object side O to an image side I. The first lens L12 may be an aspherical lens having positive refractive power and including an object-side surface S1 convex toward the object side O. For example, the first lens L12 may be a biconvex lens. The second lens L22 may be an aspherical lens having negative refractive power. The second lens L22 may be, for example, a biconcave lens. The third lens L32 may be an aspherical lens having positive refractive power. The third lens L32 may be, for example, a biconvex lens. The fourth lens L42 may be an aspherical lens having negative refractive power. The fourth lens L42 may be, for example, a biconcave lens. The fifth lens L52 may have positive or negative refractive power. For example, the fifth lens L52 may be a meniscus lens convex toward the object side O. All of the first lens L12, the second lens L22, the third lens L32, the fourth lens L42, and the fifth lens L52 may be plastic aspherical lenses. In addition, when each lens of the lens assembly 100-2 of the second numerical embodiment is substantially the same as that of the lens assembly 100-1 of the first numerical embodiment, redundant descriptions thereof will be omitted for conciseness.

Figure 6:
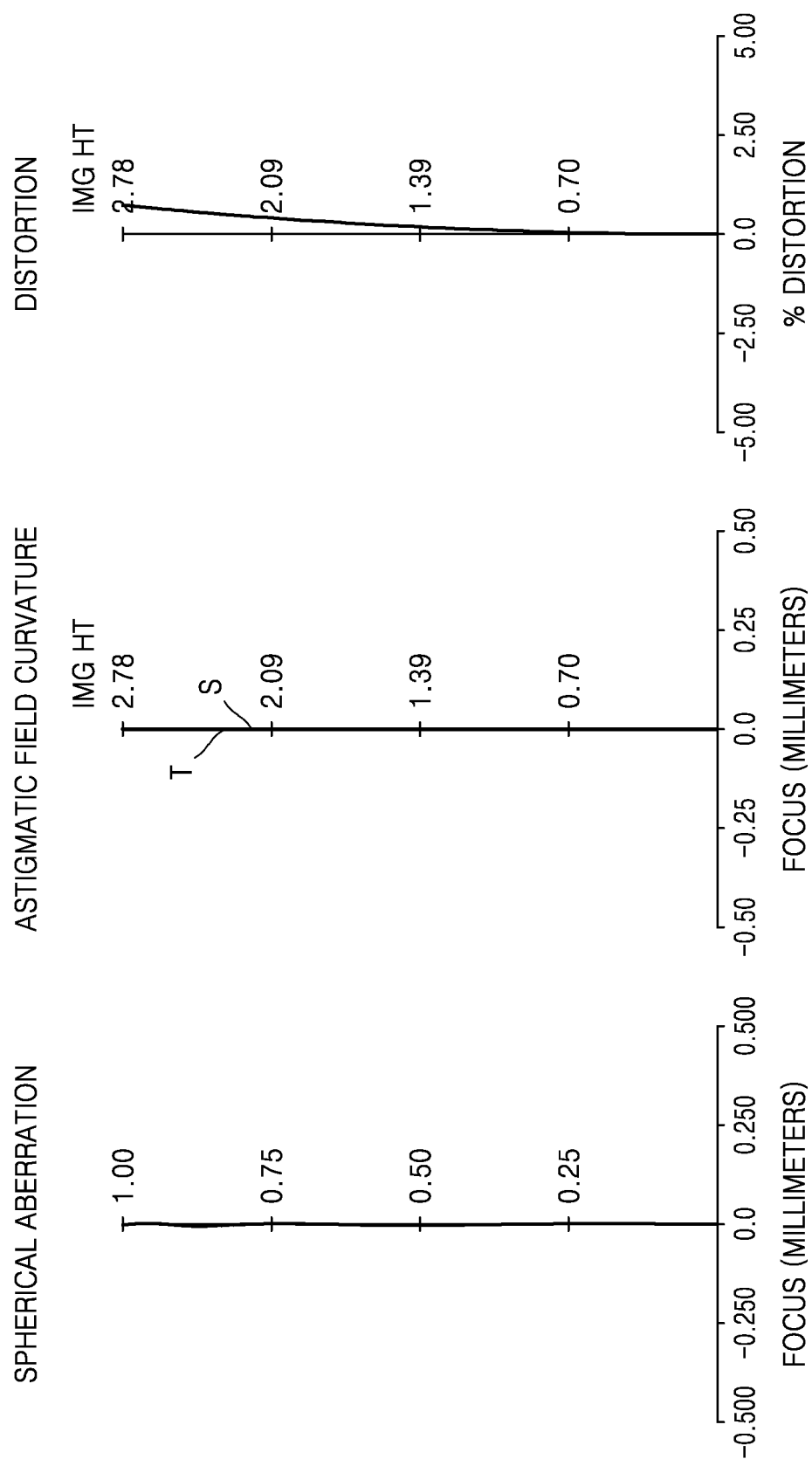
FIG. 6 illustrates a longitudinal spherical aberration, an astigmatic field curvature, and a distortion aberration (or distortion) of the optical lens assembly according to the second numerical embodiment.

FIG. 6 illustrates a longitudinal spherical aberration, an astigmatic field curvature, and a distortion aberration (or distortion) of the lens assembly 100-2 according to the second numerical embodiment.

Figure 7:
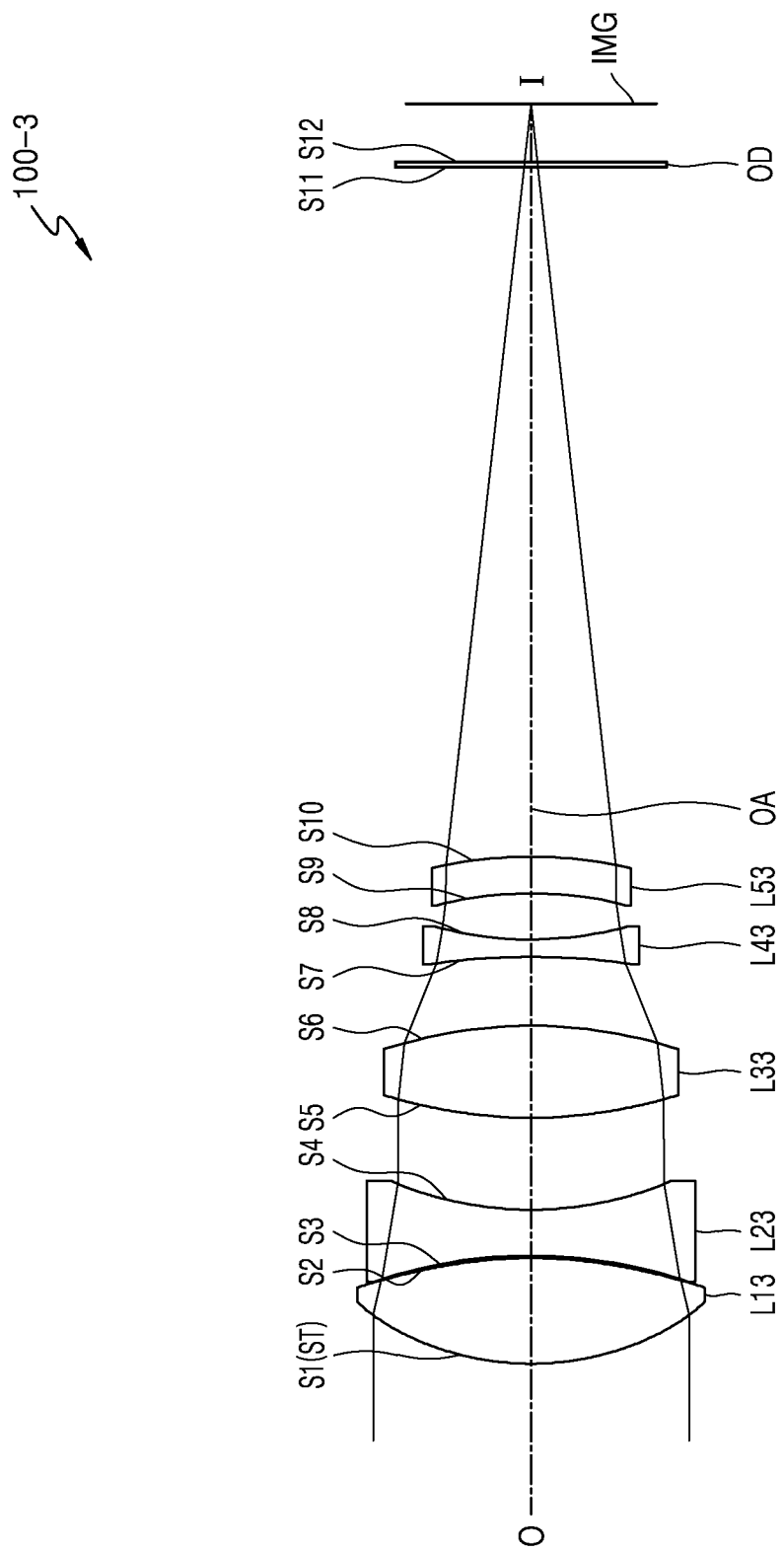
FIG. 7 illustrates a lens assembly of a third numerical embodiment of the disclosure.

FIG. 7 illustrates a lens assembly of a third numerical embodiment of the disclosure.

According to an embodiment of the disclosure, a lens assembly 100-3 may include a first lens L13, a second lens L23, a third lens L33, a fourth lens L43, and a fifth lens L53 arranged from an object side O to an image side I. The first lens L13 may be an aspherical lens having positive refractive power and including an object-side surface S1 convex toward the object side O. For example, the first lens L13 may be a biconvex lens. The second lens L23 may be an aspherical lens having negative refractive power. The second lens L23 may be, for example, a biconcave lens. The third lens L33 may be an aspherical lens having positive refractive power. The third lens L33 may be, for example, a biconvex lens. The fourth lens L43 may be an aspherical lens having negative refractive power. The fourth lens L43 may be, for example, a biconcave lens. The fifth lens L53 may have positive or negative refractive power. For example, the fifth lens L53 may be an aspherical meniscus lens concave toward the object side O. The fifth lens L53 may be a double-sided aspherical lens. In the present embodiment, the third lens L33, the fourth lens L43, and the fifth lens L53 may be plastic aspherical lenses. In addition, when each lens of the lens assembly 100-3 of the third numerical embodiment is substantially the same as that of the lens assembly 100-1 of the first numerical embodiment, redundant descriptions thereof will be omitted for conciseness.

Figure 8:
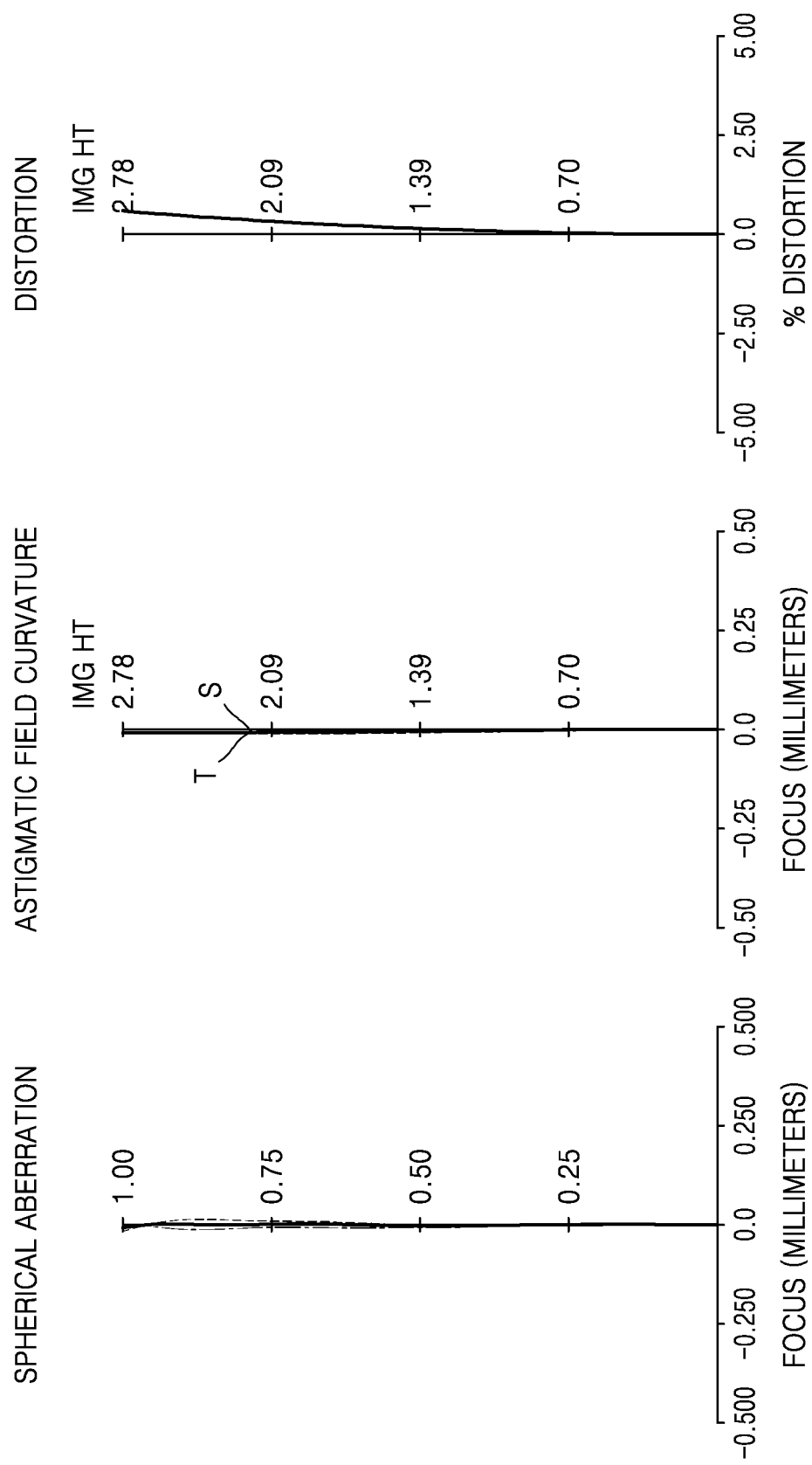
FIG. 8 illustrates a longitudinal spherical aberration, an astigmatic field curvature, and a distortion aberration (or distortion) of the optical lens assembly according to the third numerical embodiment.

FIG. 8 illustrates a longitudinal spherical aberration, an astigmatic field curvature, and a distortion aberration (or distortion) of the lens assembly 100-3 according to the third numerical embodiment.

Figure 9:
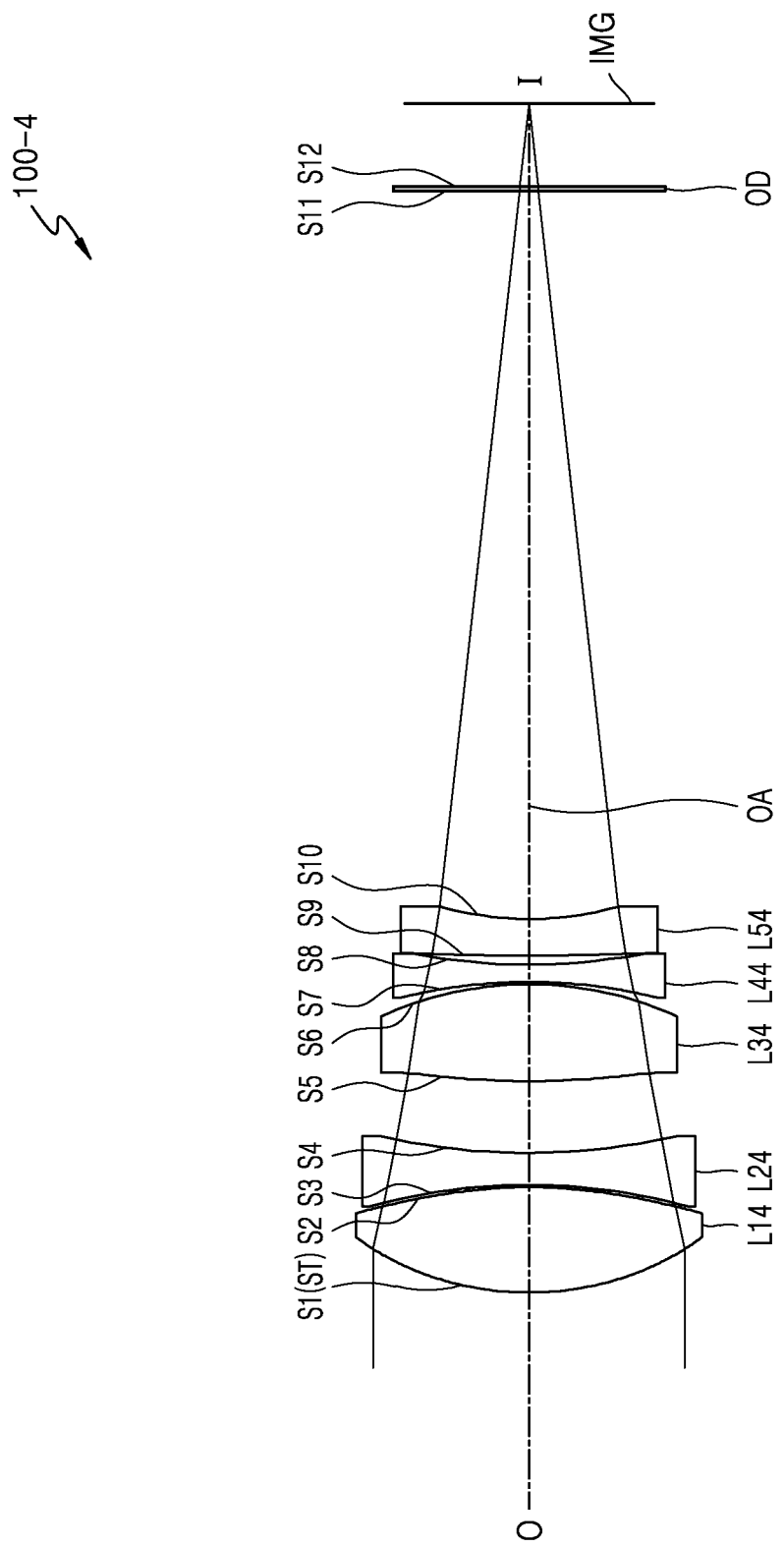
FIG. 9 illustrates a lens assembly of a fourth numerical embodiment of the disclosure.

FIG. 9 illustrates a lens assembly of a fourth numerical embodiment of the disclosure.

According to an embodiment of the disclosure, a lens assembly 100-4 may include a first lens L14, a second lens L24, a third lens L34, a fourth lens L44, and a fifth lens L54 arranged from an object side O to an image side I. The first lens L14 may be an aspherical lens having positive refractive power and including an object-side surface S1 convex toward the object side O. The second lens L24 may be a spherical lens having negative refractive power. The third lens L34 may be an aspherical lens having positive refractive power. The fourth lens L44 may be an aspherical lens having negative refractive power. The fifth lens L54 may have positive or negative refractive power. For example, the fifth lens L54 may be an aspherical meniscus lens convex toward the object side O. The fifth lens L54 may be a double-sided aspherical lens. In the present embodiment, the third lens L34, the fourth lens L44, and the fifth lens L54 may be plastic aspherical lenses. In addition, when each lens of the lens assembly 100-4 of the fourth numerical embodiment is substantially the same as that of the lens assembly 100-1 of the first numerical embodiment, redundant descriptions thereof will be omitted for conciseness.

Figure 10:
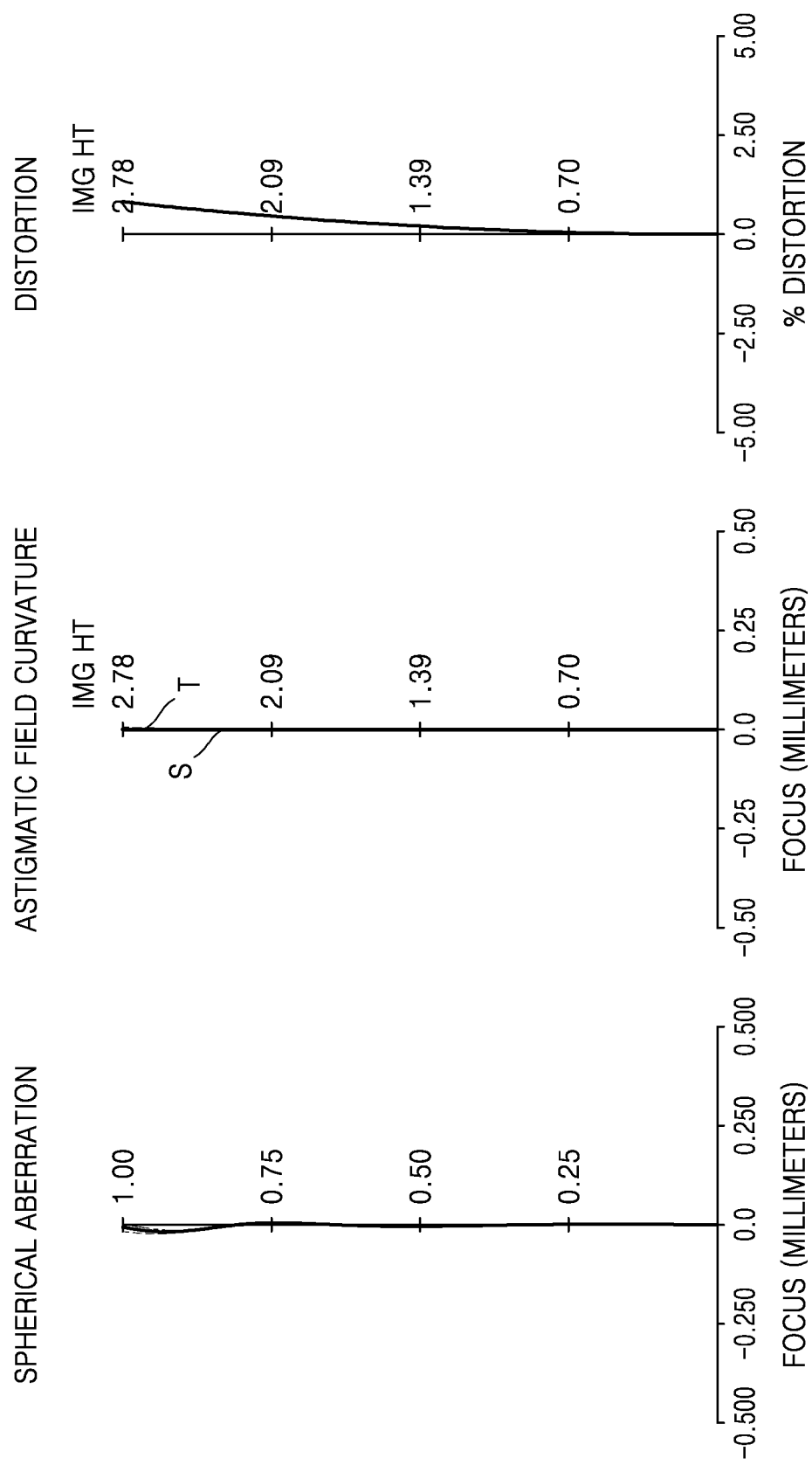
FIG. 10 illustrates a longitudinal spherical aberration, an astigmatic field curvature, and a distortion aberration (or distortion) of the optical lens assembly according to the fourth numerical embodiment.

FIG. 10 illustrates a longitudinal spherical aberration, an astigmatic field curvature, and a distortion aberration (or distortion) of the lens assembly 100-4 according to the fourth numerical embodiment.

Figure 11:
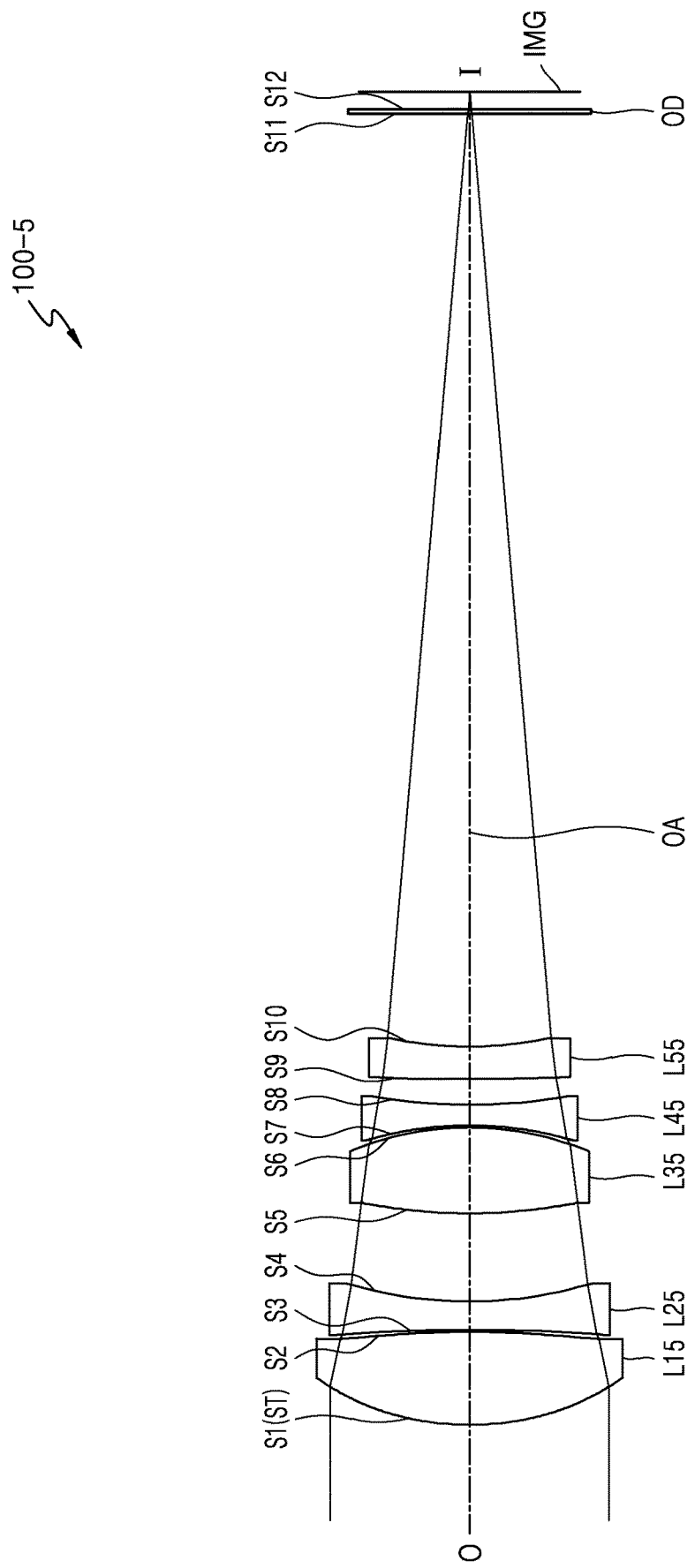
FIG. 11 illustrates a lens assembly of a fifth numerical embodiment of the disclosure.

FIG. 11 illustrates a lens assembly of a fifth numerical embodiment of the disclosure.

According to an embodiment of the disclosure, a lens assembly 100-5 may include a first lens L15, a second lens L25, a third lens L35, a fourth lens L45, and a fifth lens L55 arranged from an object side O to an image side I. The first lens L15 may be an aspherical lens having positive refractive power and including an object-side surface S1 convex toward the object side O. The second lens L25 may be a spherical lens having negative refractive power. The third lens L35 may be an aspherical lens having positive refractive power. The fourth lens L45 may be an aspherical lens having negative refractive power. The fifth lens L55 may have positive or negative refractive power. For example, the fifth lens L55 may be a spherical meniscus lens convex toward the object side O. In the present embodiment, the third lens L35, the fourth lens L45, and the fifth lens L55 may be plastic aspherical lenses. In addition, when each lens of the lens assembly 100-5 of the fifth numerical embodiment is substantially the same as that of the lens assembly 100-1 of the first numerical embodiment, redundant descriptions thereof will be omitted for conciseness.

Figure 12:
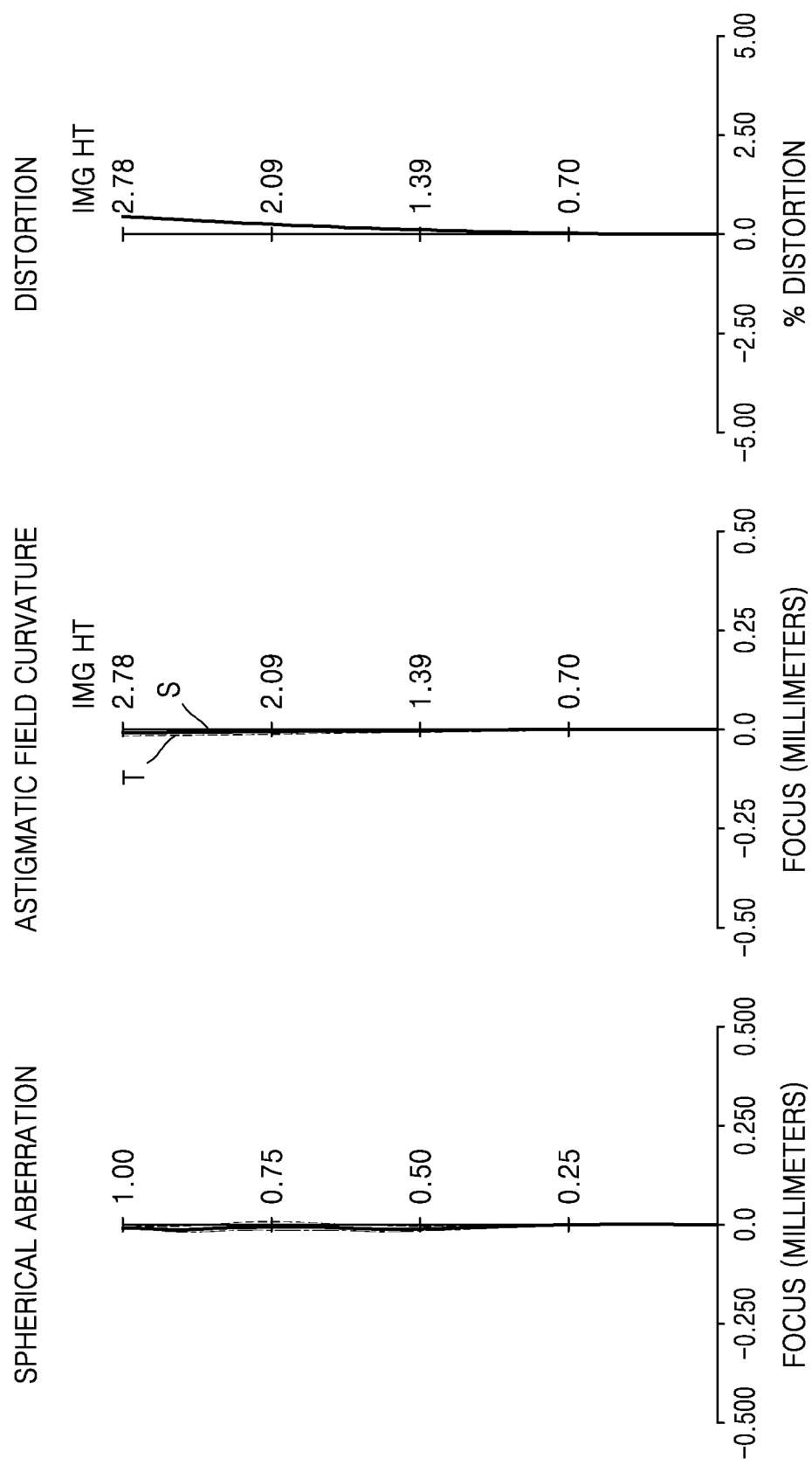
FIG. 12 illustrates a longitudinal spherical aberration, an astigmatic field curvature, and a distortion aberration (or distortion) of the optical lens assembly according to the fifth numerical embodiment.

FIG. 12 illustrates a longitudinal spherical aberration, an astigmatic field curvature, and a distortion aberration (or distortion) of the lens assembly 100-5 according to the fifth numerical embodiment.

Figure 13:
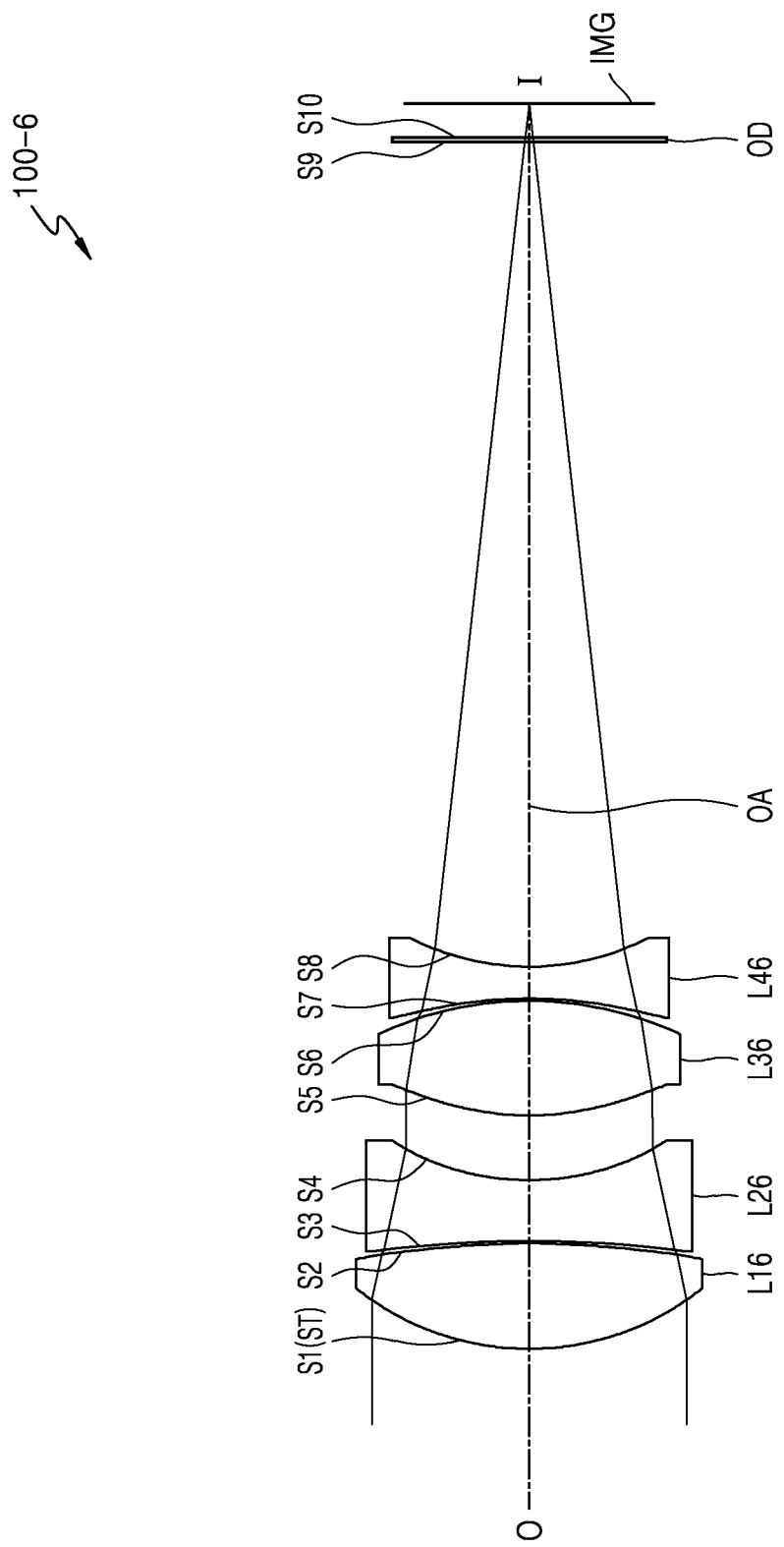
FIG. 13 illustrates a lens assembly of a sixth numerical embodiment of the disclosure.

FIG. 13 illustrates a lens assembly of a sixth numerical embodiment of the disclosure.

According to an embodiment of the disclosure, a lens assembly 100-6 may include a first lens L16, a second lens L26, a third lens L36, and a fourth lens L46 arranged from an object side O to an image side I. The first lens L16 may be an aspherical lens having positive refractive power and including an object-side surface S1 convex toward the object side O. The second lens L26 may be an aspherical lens having negative refractive power. The third lens L36 may be an aspherical lens having positive refractive power. The fourth lens L46 may be an aspherical lens having negative refractive power. The fourth lens L46 may be a biconcave lens. In the present embodiment, the third lens L16, the fourth lens L26, the fifth lens L36, and the fourth lens L46 may be plastic aspherical lenses. In addition, when each lens of the lens assembly 100-6 of the sixth numerical embodiment is substantially the same as that of the lens assembly 100-1 of the first numerical embodiment, redundant descriptions thereof will be omitted for conciseness. In the present embodiment, the lens assembly 100-6 may include four lenses.

Figure 14:
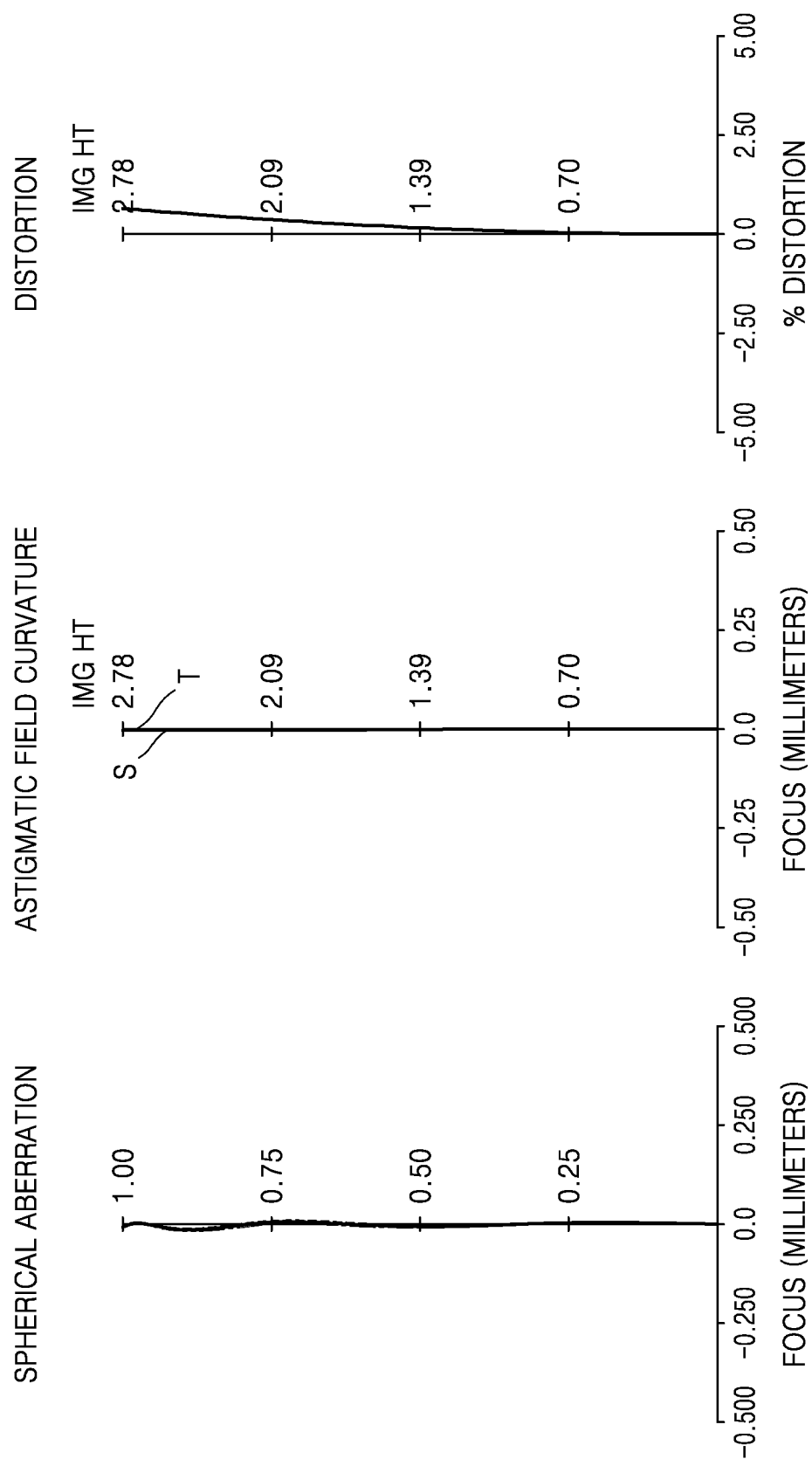
FIG. 14 illustrates a longitudinal spherical aberration, an astigmatic field curvature, and a distortion aberration (or distortion) of the optical lens assembly according to the sixth numerical embodiment.

FIG. 14 illustrates a longitudinal spherical aberration, an astigmatic field curvature, and a distortion aberration (or distortion) of the lens assembly 100-6 according to the sixth numerical embodiment.

Moreover, the aspherical surface used in the lens assembly according to certain embodiments of the disclosure may be defined as follows.

When an optical axis direction is set to an x axis and a direction perpendicular to the optical axis direction is set to a Y axis, an aspherical shape may be represented as the following expression with the positive traveling direction of rays. Herein, "x" denotes the distance in the optical axis direction from the vertex of the lens, "y" denotes the distance in the direction perpendicular to the optical axis, "K" denotes a conic constant, "A, B, C, D, . . . " denote aspherical coefficients, and "c" denotes a reciprocal number (1/R) of the curvature radius at the vertex of the lens.

$$x = \frac{cy^2}{1 + \sqrt{1 - (K+1)c^2y^2}} + Ay^4 + By^6 + Cy^8 + Dy^{10} + \ldots \quad \langle \text{Equation 5} \rangle$$

In the disclosure, an optical lens assembly may be implemented as numerical embodiments according to various designs as follows.

In each numerical embodiment, lens surface numbers S1, S2, S3, . . . Sn ("n" is a natural number) are assigned in a line sequentially from the object side O to the image side I. "EFL" denotes a focal length of the lens assembly, "FL" denotes a focal length of each lens included in the lens assembly, "Fno" denotes an F number, "FOV" denotes a half viewing angle (half field of view), "R" denotes a curvature radius, "D" denotes a thickness of the lens or an air gap between the lenses, "nd" denotes a refractive index, and "vd" denotes an Abbe number. "ST" denotes a stop, and "obj" denotes an object. "*" denotes an aspherical surface.

First Numerical Embodiment

FIG. 1 illustrates the lens assembly 100-1 according to the first numerical embodiment of the disclosure, and Table 1 shows, for example, design data of the first numerical embodiment.
EFL: 30.9 mm, Fno: 4.9

TABLE 1

| Lens surface | R | D | FL (e-line) | nd | vd |
|---|---|---|---|---|---|
| obj | infinity | infinity | | | |
| S1(ST)* | 8.752 | 1.088 | 18.0775 | 1.5162 | 56.75 |
| S2* | 134.858 | 2.1 | | | |
| S3* | 9.076 | 0.979 | 11.3884 | 1.5441 | 56.09 |
| S4* | −18.788 | 0.2 | | | |
| S5* | −12.694 | 1 | −3.9619 | 1.61442 | 25.95 |
| S6* | 3.102 | 0.451 | | | |
| S7* | 3.721 | 0.752 | 8.2483 | 1.65034 | 21.52 |
| S8* | 11.178 | 0.084 | | | |
| S9* | 8.935 | 1 | −69.0765 | 1.5441 | 56.09 |
| S10* | 6.934 | 19 | | | |
| S11 | infinity | 0.11 | | 1.5168 | 64.17 |
| S12 | infinity | | | | |
| IMG | infinity | | | | |

Table 2 shows aspherical coefficients in the first numerical embodiment.

TABLE 2

| Lens surface | K | A | B | C | D |
|---|---|---|---|---|---|
| S1* | −9.61456.E+00 | 2.64726.E−03 | −7.97728.E−05 | −2.25165.E−05 | 4.23763.E−06 |
| S2* | 8.64002.E+02 | 1.23948.E−03 | −8.69371.E−05 | −3.78815.E−05 | 8.47236.E−06 |
| S3* | 7.33110.E+00 | −5.50099.E−03 | 7.37047.E−04 | −7.24707.E−05 | −1.77475.E−05 |
| S4* | 3.12142.E+01 | −1.87839.E−02 | 1.01108.E−02 | −2.43923.E−03 | 2.83745.E−04 |
| S5* | 1.82775.E+01 | −1.73441.E−02 | 8.73947.E−03 | −1.95518.E−03 | 2.43443.E−04 |
| S6* | −5.02579.E+00 | −4.54250.E−03 | −5.24718.E−03 | 4.34790.E−03 | −1.19030.E−03 |
| S7* | −5.71510.E+00 | −2.90140.E−03 | −2.42949.E−03 | 2.18012.E−03 | −5.07713.E−04 |
| S8* | −6.12089.E+01 | −2.54031.E−02 | 1.50753.E−02 | −3.62873.E−03 | 3.51060.E−04 |
| S9* | −3.18939.E+01 | −3.08057.E−02 | 1.84956.E−02 | −4.18363.E−03 | 5.20643.E−04 |
| S10* | 4.94274.E+00 | −4.86250.E−03 | 1.08040.E−03 | 4.32322.E−04 | −5.39062.E−05 |

| Lens surface | E | F | G | H | J |
|---|---|---|---|---|---|
| S1* | −2.48038.E−07 | 1.93951.E−09 | | | |
| S2* | −6.58496.E−07 | 1.55875.E−08 | | | |
| S3* | 3.81592.E−06 | −2.77934.E−07 | 9.29337.E−09 | 0.00000.E+00 | 0.00000.E+00 |
| S4* | −8.23982.E−06 | −1.22309.E−06 | 8.39402.E−08 | 0.00000.E+00 | 0.00000.E+00 |
| S5* | −1.03352.E−05 | −8.02882.E−07 | 6.47506.E−08 | 0.00000.E+00 | 0.00000.E+00 |
| S6* | 1.98775.E−04 | −2.13631.E−05 | 1.04699.E−06 | 0.00000.E+00 | 0.00000.E+00 |
| S7* | 3.60510.E−05 | 0.00000.E+00 | | | |
| S8* | −1.11041.E−05 | 0.00000.E+00 | | | |
| S9* | −2.64006.E−05 | 0.00000.E+00 | | | |
| S10* | 0.00000.E+00 | 0.00000.E+00 | | | |

Second Numerical Embodiment

FIG. 5 illustrates the lens assembly 100-2 according to the second numerical embodiment, and Table 3 shows, for example, design data of the second numerical embodiment.

EFL: 30.9 mm, Fno: 4.4

TABLE 3

| Lens surface | R | D | FL (e-line) | nd | vd |
|---|---|---|---|---|---|
| obj | infinity | infinity | | | |
| S1(ST)* | 6.388 | 2.3 | 8.3378 | 1.5348 | 55.71 |
| S2* | −12.916 | 0.05 | | | |
| S3 | −16.737 | 1.33 | −8.8179 | 1.61444 | 25.94 |
| S4* | 8.254 | 1.567 | | | |
| S5* | 8.605 | 1.522 | 6.8494 | 1.65037 | 21.52 |
| S6 | −8.592 | 0.05 | | | |
| S7* | −12.452 | 0.767 | −7.8429 | 1.63492 | 23.89 |
| S8 | 8.497 | 0.23 | | | |
| S9 | 51.891 | 0.8 | −23.6199 | 1.5441 | 56.09 |
| S10 | 10.245 | 17 | | | |
| S11 | infinity | 0.11 | | 1.5168 | 64.17 |
| S12 | infinity | 0.59 | | | |
| IMG | infinity | 0 | | | |

Table 4 shows aspherical coefficients in the second numerical embodiment.

TABLE 4

| Lens surface | K | A | B | C | D |
|---|---|---|---|---|---|
| S1 | −3.229400.E−01 | 1.994264.E−04 | 9.286518.E−06 | 6.398143.E−07 | −2 944503.E−08 |
| S2 | 0.000000.E+00 | 5.995384.E−04 | 6.859981.E−06 | −8.969488.E−07 | 2.089469.E−08 |
| S4 | 0.000000.E+00 | −1.716042.E−04 | −2.291262.E−06 | −6.444615.E−07 | 3.968568.E−07 |
| S5 | −5.493000.E−02 | −4.182969.E−04 | 1.154593.E−05 | −1.078649.E−05 | 9.431159.E−07 |
| S7 | −4.646030.E+00 | −7.435703.E−04 | −2.272012.E−05 | 1.108718.E−05 | −5.754344.E−07 |

| Lens surface | E | F | G | H | J |
|---|---|---|---|---|---|
| S1 | 3.597162.E−09 | −1.152636.E−10 | | | |
| S2 | −7.893727.E−10 | 0.000000.E+00 | | | |
| S4 | 0.000000.E+00 | 0.000000.E+00 | | | |
| S5 | −1.446364.E−08 | 0.000000.E+00 | | | |
| S7 | −6.978795.E−08 | 5.652417.E−09 | | | |

Third Numerical Embodiment

FIG. 7 illustrates the lens assembly 100-3 according to the third numerical embodiment, and Table 5 shows, for example, design data of the third numerical embodiment. EFL: 30.9 mm, Fno: 4.4

TABLE 5

| Lens surface | R | D | FL (e-line) | nd | vd |
|---|---|---|---|---|---|
| obj | infinity | infinity | | | |
| S1(ST)* | 6.499 | 2.3 | 7.5409 | 1.55332 | 71.68 |
| S2* | −10.187 | 0.05 | | | |
| S3 | −10.906 | 1 | −6.5407 | 1.68893 | 31.16 |
| S4* | 7.966 | 2 | | | |
| S5* | 10.505 | 2 | 8.4334 | 1.65037 | 21.52 |
| S6 | −10.617 | 1.5 | | | |
| S7* | −16.344 | 0.38 | −8.7199 | 1.63492 | 23.89 |
| S8 | 8.448 | 1 | | | |
| S9 | −8.665 | 0.8 | −162.2017 | 1.5441 | 56.09 |
| S10 | −9.921 | 15 | | | |
| S11 | infinity | 0.11 | | 1.5168 | 64.17 |
| S12 | infinity | 1.269 | | | |
| IMG | infinity | 0 | | | |

Table 6 shows aspherical coefficients in the third numerical embodiment.

TABLE 6

| Lens surface | K | A | B | C | D |
|---|---|---|---|---|---|
| S1 | −2.64420.0E−01 | 1.713981.E−04 | 8.271223.E−06 | 9.093209.E−07 | −2.591675.E−08 |
| S2 | 0.000000.E+00 | 5.803376.E−04 | 6.406182.E−06 | −8.915664.E−07 | 3.248619.E−08 |
| S4 | 0.000000.E+00 | −2.538164.E−04 | −2.904204.E−06 | −1.321005.E−06 | 4.313154.E−07 |
| S5 | 7.542200.E−01 | −3.501852.E−04 | 1.767816.E−05 | −7.961376.E−06 | 9.916983.E−07 |
| S7 | −9.995920.E+00 | −5.456237.E−04 | −6.333273.E−05 | 2.176818.E−05 | −1.325828.E−06 |

| Lens surface | E | F | G | H |
|---|---|---|---|---|
| S1 | 3.604210.E−09 | −6.752695.E−12 | | |
| S2 | −1.909814.E−09 | 0.000000.E+00 | | |
| S4 | 0.000000.E+00 | 0.000000.E+00 | | |
| S5 | −3.510289.E−08 | 0.000000.E+00 | | |
| S7 | −5.597048.E−07 | 6.967773.E−08 | | |

Fourth Numerical Embodiment

FIG. 9 illustrates the lens assembly 100-4 according to the fourth numerical embodiment, and Table 7 shows, for example, design data of the fourth numerical embodiment. EFL: 30.9 mm, Fno: 4.4

TABLE 7

| Lens surface | R | D | FL (e-line) | nd | vd |
|---|---|---|---|---|---|
| obj | infinity | infinity | | | |
| S1(ST)* | 7.002 | 2.3 | 7.6173 | 1.59201 | 67.02 |
| S2* | −11.229 | 0.05 | | | |
| S3 | −13.451 | 0.7 | −10.4349 | 1.6727 | 32.17 |
| S4 | 15.222 | 1.566 | | | |
| S5* | 18.014 | 2.115 | 8.7198 | 1.65037 | 21.52 |
| S6 | −8.016 | 0.05 | | | |
| S7* | −12.483 | 0.38 | −10.2674 | 1.63492 | 23.89 |
| S8 | 14.092 | 0.195 | | | |
| S9 | 70.782 | 0.8 | −15.325 | 1.5441 | 56.09 |
| S10 | 7.459 | 15.892 | | | |
| S11 | infinity | 0.11 | | 1.5168 | 64.17 |
| S12 | infinity | 1.805 | | | |
| IMG | infinity | 0 | | | |

Table 8 shows aspherical coefficients in the fourth numerical embodiment.

TABLE 8

| Lens surface | K | A | B | C | D |
|---|---|---|---|---|---|
| S1 | −2.9731000.E−01 | 2.1953420.E−04 | 8.9135530.E−06 | 5.8922450.E−07 | −3.8395760.E−08 |
| S2 | 0.0000000.E+00 | 5.7595070.E−04 | 5.0759550.E−06 | −9.2999360.E−07 | 2.3180910.E−08 |
| S5 | 1.1247000.E+00 | −3.4925040.E−04 | 1.5984430.E−05 | −1.1282650.E−05 | 8.1324230.E−07 |
| S7 | −4.9167800.E+00 | −7.3647360.E−04 | −2.5551330.E−05 | 1.1232020.E−05 | −4.3995590.E−07 |

| Lens surface | E | F | G | H |
|---|---|---|---|---|
| S1 | 2.9565290.E−09 | −1.2371250.E−10 | | |
| S2 | −9.6310750.E−10 | 0.0000000.E+00 | | |
| S5 | −3.4782800.E−08 | 0.0000000.E+00 | | |
| S7 | −6.8967010.E−08 | 7.1951720.E−09 | | |

Fifth Numerical Embodiment

FIG. 11 illustrates the lens assembly 100-5 according to the fifth numerical embodiment, and Table 9 shows, for example, design data of the fifth numerical embodiment. EFL: 40.0 mm, Fno: 5.7

TABLE 9

| Lens surface | R | D | FL (e-line) | nd | vd |
|---|---|---|---|---|---|
| Obj | infinity | infinity | | | |
| S1(ST)* | 7.255 | 2.3 | 9.5977 | 1.58913 | 61.25 |
| S2* | −22.62 | 0.05 | | | |
| S3 | −46.064 | 0.7 | −11.648 | 1.75519 | 27.53 |
| S4 | 10.944 | 2.163 | | | |
| S5* | 13.193 | 2.121 | 7.9241 | 1.65037 | 21.52 |
| S6 | −7.921 | 0.05 | | | |
| S7* | −9.513 | 0.517 | −9.101 | 1.63492 | 23.89 |
| S8 | 15.03 | 0.632 | | | |
| S9 | 70.792 | 0.8 | −20.7295 | 1.5441 | 56.09 |
| S10 | 9.69 | 23 | | | |
| S11 | infinity | 0.11 | | 1.5168 | 64.17 |
| S12 | infinity | 0.424 | | | |
| IMG | infinity | 0 | | | |

Table 10 shows aspherical coefficients in the fifth numerical embodiment.

Sixth Numerical Embodiment

FIG. 13 illustrates the lens assembly 100-6 according to the sixth numerical embodiment, and Table 11 shows, for example, design data of the sixth numerical embodiment. EFL: 30.9 mm, Fno: 4.4

TABLE 11

| Lens surface | R | D | FL (e-line) | nd | vd |
|---|---|---|---|---|---|
| obj | infinity | infinity | | | |
| S1(ST)* | 6.375 | 2.3 | 9.144 | 1.5348 | 55.71 |
| S2* | −18.357 | 0.05 | | | |
| S3 | −27.485 | 1.33 | −7.7824 | 1.61444 | 25.94 |
| S4* | 5.896 | 1.417 | | | |
| S5* | 6.625 | 2.5 | 5.9995 | 1.65037 | 21.52 |
| S6 | −8.082 | 0.05 | | | |
| S7* | −10.356 | 0.7 | −5.8635 | 1.63492 | 23.89 |
| S8 | 5.965 | 18 | | | |
| S9 | infinity | 0.11 | | 1.5168 | 64.17 |
| S10 | infinity | 0.737 | | | |
| IMG | infinity | 0 | | | |

Table 12 shows aspherical coefficients in the sixth numerical embodiment.

TABLE 10

| Lens surface | K | A | B | C | D |
|---|---|---|---|---|---|
| S1 | −3.07720000.E−01 | 2.43404900.E−04 | 7.21403300.E−06 | 5.59357300.E−07 | −4.39229500.E−08 |
| S2 | 0.00000000.E+00 | 5.45816600.E−04 | 4.12438600.E−06 | −8.69408900.E−07 | 4.09544800.E−08 |
| S5 | 2.01496000.E+00 | −2.82525200.E−04 | 1.76671000.E−05 | −1.08013200.E−05 | 7.91387700.E−07 |
| S7 | −3.88239000.E+00 | −7.94650900.E−04 | −2.85006500.E−05 | 1.21187800.E−05 | −4.17715400.E−07 |

| Lens surface | E | F | G | H | J |
|---|---|---|---|---|---|
| S1 | 2.60528500.E−09 | −6.40114400.E−11 | | | |
| S2 | −1.28741400.E−09 | 0.00000000.E+00 | | | |
| S5 | −4.07431900.E−08 | 0.00000000.E+00 | | | |
| S7 | −7.90109100.E−08 | 8.39395900.E−09 | | | |

TABLE 12

| Lens surface | K | A | B | C | D |
|---|---|---|---|---|---|
| S1 | −2.796500000.E−01 | 2.185238000.E−04 | 7.624195000.E−06 | 5.354501000.E−07 | −2.681950000.E−08 |
| S2 | 0.000000000.E+00 | 5.943938000.E−04 | 3.776041000.E−06 | −1.241556000.E−06 | −1.074285000.E−08 |
| S4 | 0.000000000.E+00 | −1.004750000.E−04 | −3.231913000.E−07 | −2.086940000.E−07 | 4.535841000.E−07 |
| S5 | 6.790000000.E−02 | −4.206158000.E−04 | 1.025803000.E−05 | −1.189531000.E−05 | 7.857699000.E−07 |
| S7 | −5.338680000.E+00 | −6.757157000.E−04 | −7.634305000.E−06 | 1.267722000.E−05 | −4.230004000.E−07 |

| Lens surface | E | F | G | H | J |
|---|---|---|---|---|---|
| S1 | 3.694927000.E−09 | −3.441012000.E−10 | | | |
| S2 | −1.855852000.E−09 | 0.000000000.E+00 | | | |
| S4 | 0.000000000.E+00 | 0.000000000.E+00 | | | |
| S5 | −2.191706000.E−08 | 0.000000000.E+00 | | | |
| S7 | −6.054531000.E−08 | 5.249441000.E−09 | | | |

Table 13 shows values for Expressions 1 to 4 in the lens assembly according to the first to sixth numerical embodiments.

TABLE 13

| | Expression (1) FOV | Expression (2) (L/FOV) | Expression (3) (L1R1/EFL) | Expression (4) (BFL/FOV) |
|---|---|---|---|---|
| Embodiment 1 | 5.1 | 1.5 | 0.28 | 3.76 |
| Embodiment 2 | 5.1 | 1.7 | 0.21 | 3.46 |
| Embodiment 3 | 5.1 | 2.2 | 0.21 | 3.20 |
| Embodiment 4 | 5.1 | 1.6 | 0.23 | 3.49 |
| Embodiment 5 | 4.0 | 2.4 | 0.18 | 5.93 |
| Embodiment 6 | 5.1 | 1.6 | 0.21 | 3.68 |

The lens assembly according to certain embodiments of the disclosure may be applied, for example, to an electronic apparatus including an image sensor. The lens assembly according to an embodiment of the disclosure may be applied to various electronic apparatuses such as digital cameras, interchangeable lens cameras, video cameras, mobile phone cameras, compact mobile device cameras, VR cameras, AR cameras, drones, or unmanned aerial vehicles.

Figure 15:
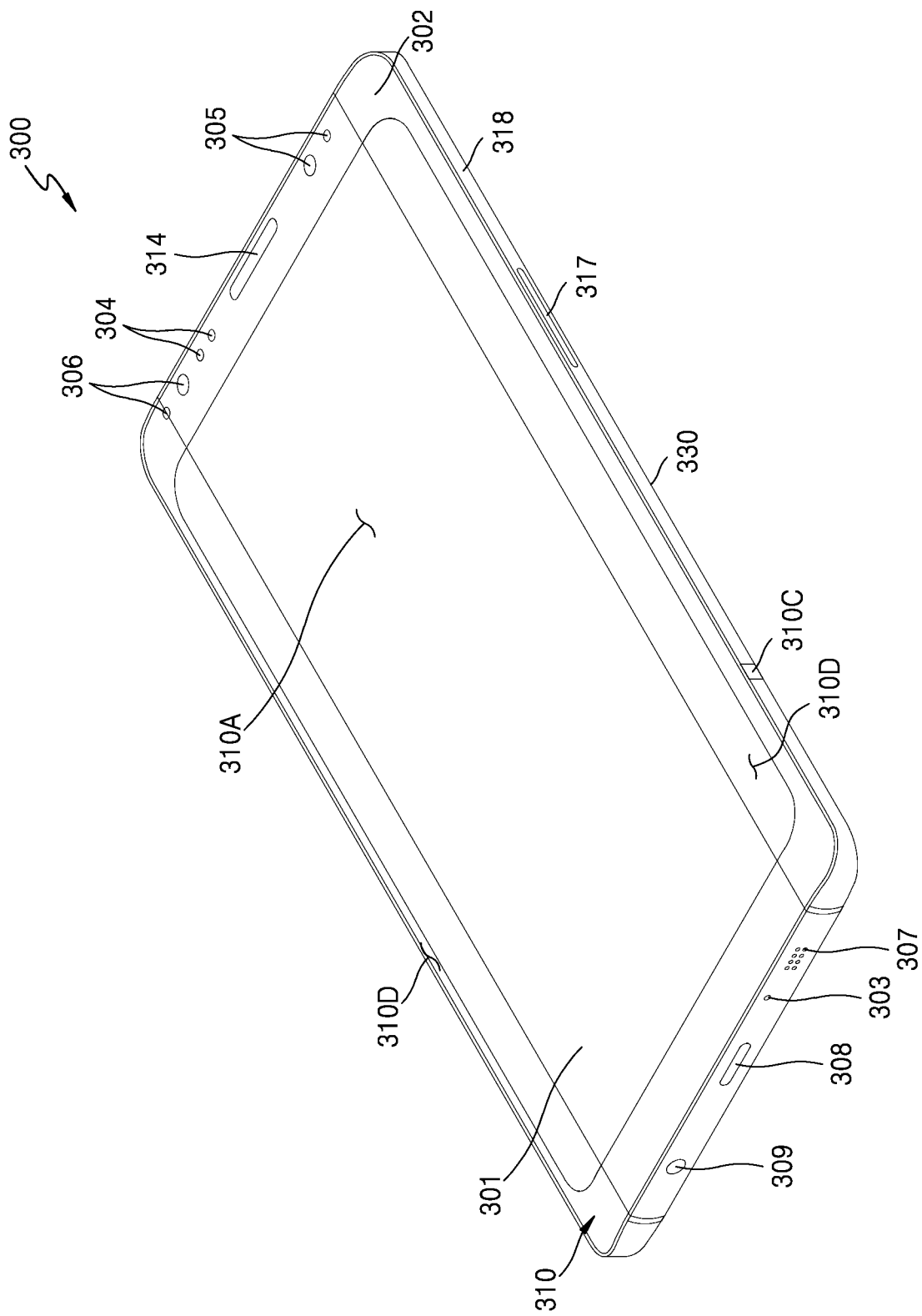
FIG. 15 illustrates a front view of a mobile apparatus including a lens assembly according to an embodiment of the disclosure of the disclosure.
Figure 16:
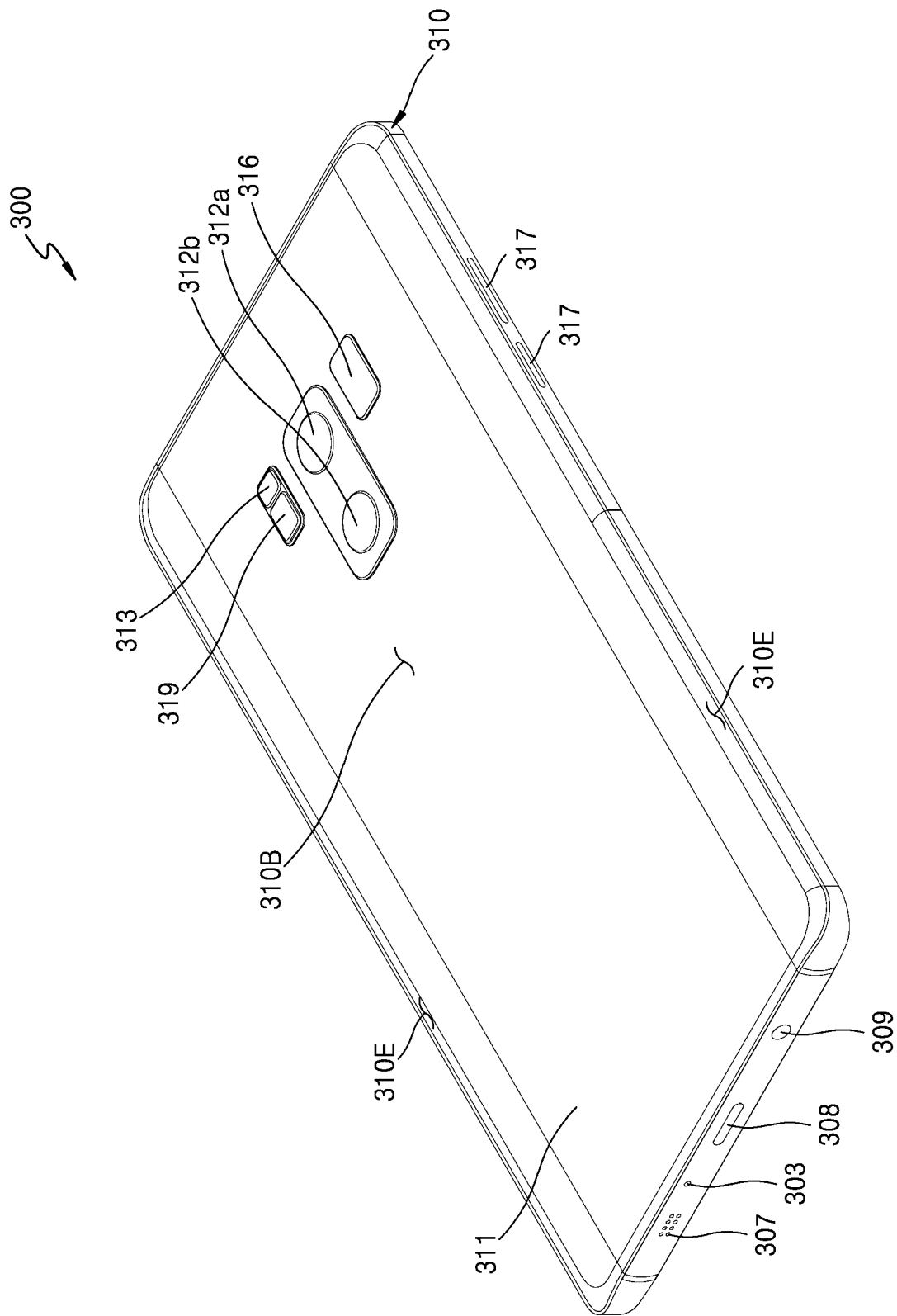
FIG. 16 illustrates a rear view of the mobile apparatus including the lens assembly according to an embodiment of the disclosure.

FIGS. 15 and 16 illustrate an example of an electronic apparatus including a lens assembly according to an embodiment of the disclosure. Although FIGS. 15 and 16 illustrate an example in which the electronic apparatus is applied to a mobile phone, the disclosure is not limited thereto. FIG. 15 illustrates a front surface of the mobile phone, and FIG. 16 illustrates a rear surface (back surface) of the mobile phone.

An electronic apparatus 300 according to an embodiment of the disclosure may include a housing 310 including a first surface (or front surface) 310A, a second surface (or rear surface) 310B, and a side surface 310C surrounding the space between the first surface 310A and the second surface 310B. In another embodiment (not illustrated) of the disclosure, the housing 310 may refer to a structure that forms some of the first surface 310A, the second surface 310B, and the side surface 310C. According to an embodiment of the disclosure, the first surface 310A may be formed by a front plate 302 (e.g., a glass plate including various coating layers, or a polymer plate) at least a portion of which is substantially transparent. In another embodiment of the disclosure, the front plate 302 may be coupled to the housing 310 to create an internal space with the housing 310. In certain embodiments of the disclosure, the term "internal space" may refer to a space accommodating at least a portion of a display 301 as an internal space of the housing 310.

According to an embodiment of the disclosure, the second surface 310B may be formed by a rear plate 311 that is substantially opaque. The rear plate 311 may include, for example, coated or tinted glass, ceramic, polymer, metal (e.g., aluminum, stainless steel (STS), or magnesium), or a combination of at least two of these materials. The side surface 310C may be coupled to the front plate 302 and the rear plate 311 and may be formed by a side bezel structure (or "side member") 318 including metal and/or polymer. In an embodiment of the disclosure, the rear plate 311 and the side bezel structure 318 may be integrally formed with each other and may include the same material (e.g., a metal material such as aluminum).

In the illustrated embodiment, at both ends of a long edge of the front plate 302, the front plate 302 may include two first regions 310D that extend seamlessly from the first surface 310A by bending toward the rear plate 311. At both ends of the long edge, the rear plate 311 may include two second regions 310E that extend seamlessly from the second surface 310B by bending toward the front plate 302. In other embodiments of the disclosure, the front plate 302 (or the rear plate 311) may include only one of the first regions 310D (or the second regions 310E). In another embodiment of the disclosure, some of the first regions 310D or the second regions 310E may not be included. In the above embodiments of the disclosure, when viewed from the side of the electronic apparatus, the side bezel structure 318 may have a first thickness (or width) on a side not including the first region 310D or the second region 310E (e.g., a side where a connector hole 308 is formed) and may have a second thickness smaller than the first thickness on a side including the first region 310D or the second region 310E (e.g., a side where a key input unit 317 is arranged).

According to an embodiment of the disclosure, the electronic apparatus 300 may include at least one of a display 301, an audio module 303, 307, and 314, a sensor module 304, 316, and 319, a camera module 305, 312a, and 312b, a key input unit 317, a light emitting device 306, or a connector hole 308 and 309. In various embodiments of the disclosure, the electronic apparatus 300 may not include at least one of the elements (e.g., the key input unit 317 or the light emitting device 306) or may additionally include one or more other elements.

The display 301 may be exposed through, for example, a large portion of the front plate 302. In an embodiment of the disclosure, at least a portion of the display 301 may be exposed through the front plate 302 forming the first surface 310A and the first region 310D of the side surface 310C. In an embodiment of the disclosure, an edge of the display 301 may have substantially the same shape as the adjacent outer shape of the front plate 302. In another embodiment (not illustrated) of the disclosure, in order to expand the area through which the display 301 is exposed, the distance between the periphery of the display 301 and the periphery of the front plate 302 may be substantially uniform.

In another embodiment (not illustrated) of the disclosure, a recess or opening may be formed in a screen display region (e.g., an active region) of the display 301 or a portion of a region (e.g., an inactive region) outside the screen display region, and at least one of the audio module 314, the sensor module 304, the camera module 305, or the light emitting device 306 aligned with the recess or opening. Alternatively, at least one of the audio module 314, the sensor module 304, the camera module 305, a fingerprint sensor 316, or the light emitting device 306 may be included at the rear surface of the screen display region of the display 301. Alternatively, the display 301 may be coupled to or arranged adjacent to a touch sensing circuit, a pressure sensor capable of measuring the strength (pressure) of a touch, and/or a digitizer for detecting a magnetic field type stylus pen. In an embodiment of the disclosure, at least a portion of the sensor module 304 and 319 and/or at least a portion of the key input unit 317 may be arranged in the first regions 310D and/or the second regions 310E.

The audio module 303, 307, and 314 may include a microphone hole 303 and a speaker hole 307 and 314. In the microphone hole 303, a microphone for obtaining an external sound may be arranged, and in an embodiment of the disclosure, a plurality of microphones may be arranged to detect the direction of a sound. The speaker hole 307 and 314 may include an external speaker hole 307 and a call receiver hole 314. In an embodiment of the disclosure, the speaker hole 307 and 314 and the microphone hole 303 may be implemented as a single hole, or a speaker may be included without the speaker hole 307 and 314 (e.g., a piezo speaker).

The sensor module 304, 316, and 319 may generate an electrical signal or a data value corresponding to an internal operation state of the electronic apparatus 300 or an external environmental state. The sensor module 304, 316, and 319 may include, for example, a first sensor module 304 (e.g., a proximity sensor) and/or a second sensor module (not illustrated) (e.g., a fingerprint sensor) arranged at the first surface 310A of the housing 310, and/or a third sensor module 319 (e.g., a heart rate monitor (HRM) sensor) and/or a fourth sensor module 316 (e.g., a fingerprint sensor) arranged at the second surface 310B of the housing 310. The fingerprint sensor may be arranged at the second surface 310B as well as the first surface 310A (e.g., the display 301) of the housing 310. The electronic apparatus 300 may further include a sensor module (not illustrated), for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 305, 312a, and 312b may include a first camera module 305 arranged at the first surface 310A of the electronic apparatus 300, and a second camera module 312a, a third camera module 312b, and/or a flash 313 arranged at the second surface 310б of the electronic apparatus 300. The camera module 305, 312a, and 312b may include one or more lenses, an image sensor, and/or an image signal processor. For example, the camera module 305, 312a, and 312b may include the lens assemblies according to certain embodiments described with reference to FIGS. 1 to 14. The flash 313 may include, for example, a light emitting diode or a xenon lamp. In certain embodiments of the disclosure, two or more lenses (infrared camera, wide-angle, and telephoto lenses) and image sensors may be arranged at one surface of the electronic apparatus 101.

The key input unit 317 may be arranged at the side surface 310C of the housing 310. In another embodiment of the disclosure, the electronic apparatus 300 may not include some or all of the key input units 317, and the key input unit 317 not included may be implemented on the display 301 in another form such as a soft key. In various embodiments of the disclosure, the key input unit may include a sensor module 316 arranged at the second surface 310B of the housing 310.

The light emitting device 306 may be arranged, for example, at the first surface 310A of the housing 310. The light emitting device 306 may provide, for example, state information of the electronic apparatus 101 in the form of light. In another embodiment of the disclosure, the light emitting device 306 may provide, for example, a light source that is linked with an operation of the camera module 305. The light emitting device 306 may include, for example, an LED, an IR LED, and a xenon lamp.

The connector hole 308 and 309 may include a first connector hole 308 capable of accommodating a connector (e.g., a USB connector) for transmitting/receiving power and/or data to/from an external electronic apparatus, and/or a second connector hole (e.g., an earphone jack) 309 capable of accommodating a connector for transmitting/receiving audio signals to/from an external electronic apparatus.

The technical concepts of the disclosure are not limited to the electronic apparatus 300 illustrated in FIGS. 15 and 16. The technical concepts of the disclosure may be applied to various user apparatuses including the first camera module 305 arranged at the first surface 310A, and the second camera module 312a and the third camera module 312b arranged at the second surface 310B. For example, by using a flexible display and a hinge structure, the technical concepts of the disclosure may also be applied to a foldable electronic apparatus foldable in the horizontal direction or the vertical direction, a tablet, or a notebook computer. Also, the technical concepts of the disclosure may also be applied in the case where the first camera module 305, the second camera module 312a, and the third camera module 312b facing in the same direction are arranged to face in different directions through rotation, folding, transformation, or the like.

According to certain embodiments of the disclosure, the illustrated electronic apparatus 300 may be a portion of a rollable electronic device. The term "rollable electronic device" may refer to an electronic apparatus in which a display (e.g., the display 301 of FIG. 15) may be bent and thus at least a portion thereof may be wound or rolled or may be accommodated in a housing (e.g., the housing 310 of FIGS. 15 and 16). The rollable electronic device may be used with an extended screen display region by unfolding the display or exposing a larger area of the display to the outside according to the user's needs.

FIG. 17 is a block diagram of an electronic apparatus 401 in a network environment 400 according to an embodiment of the disclosure. Referring to FIG. 17, in the network environment 400, the electronic apparatus 401 may communicate with an electronic apparatus 402 through a first network 498 (e.g., a short-range wireless communication network) or may communicate with at least one of an electronic apparatus 404 or a server 408 through a second network 499 (e.g., a long-range wireless communication network). According to an embodiment of the disclosure, the electronic apparatus 401 may communicate with the electronic apparatus 404 through the server 408. According to an embodiment of the disclosure, the electronic apparatus 401 may include a processor 420, a memory 430, an input module 450, an audio output module 455, a display module 460, an audio module 470, a sensor module 476, an interface 477, a connection terminal 478, a haptic module 479, a camera module 480, a power management module 488, a battery 489, a communication module 490, a subscriber identification module 496, or an antenna module 497. In some embodiments of the disclosure, the electronic apparatus 401 may not include at least one of these elements (e.g., the connection terminal 478) or may further include one or more other elements. In some embodiments of the disclosure, some of these elements (e.g., the sensor module 476, the camera module 480, or the antenna module 497) may be integrated into one element (e.g., the display module 460).

For example, the processor 420 may control at least one other element (e.g., a hardware or software element) of the electronic apparatus 401 connected to the processor 420 by executing software (e.g., the program 440) and may perform various data processing and operations. According to an embodiment of the disclosure, as at least a portion of data processing or operation, the processor 420 may store commands or data received from another element (e.g., the sensor module 476 or the communication module 490) in a volatile memory 432, may process the commands or data stored in the volatile memory 432, and may store the result data in a nonvolatile memory 434. According to an embodiment of the disclosure, the processor 420 may include a main processor 421 (e.g., a central processing unit or an application processor) or an auxiliary processor 423 (e.g., a graphics processing unit, a neural processing unit (NPU), an image signal processor, a sensor hub processor, or a communication processor) that may be operated together with or independently of the main processor 421. For example, when the electronic apparatus 401 includes the main processor 421 and the auxiliary processor 423, the auxiliary processor 423 may use less power than the main processor 421 or may be set to be specialized for a designated function. The auxiliary processor 423 may be implemented separately from or as a portion of the main processor 421.

For example, the auxiliary processor 423 may control at least some of the states or the function related to at least one element (e.g., the display module 460, the sensor module 476, or the communication module 490) among the elements of the electronic apparatus 401 on behalf of the main processor 421 while the main processor 421 is in an inactive (e.g., sleep) state or together with the main processor 421 while the main processor 421 is in an active (e.g., application execution) state. According to an embodiment of the disclosure, the auxiliary processor 423 (e.g., an image signal processor or a communication processor) may be implemented as a portion of another element (e.g., the camera module 480 or the communication module 490) functionally related thereto. According to an embodiment of the disclosure, the auxiliary processor 423 (e.g., a neural processing unit) may include a hardware structure specialized for the processing of an artificial intelligence model. The artificial intelligence model may be generated through machine learning. This learning may be performed, for example, in the electronic apparatus 401 itself in which the artificial intelligence model is performed or may be performed through a separate server (e.g., the server 408). Examples of the training algorithm may include, but are not limited to, supervised learning, unsupervised learning, semi-supervised learning, or reinforcement learning. The artificial intelligence model may include a plurality of neural network layers. The artificial neural network may include, but is not limited to, Deep Neural Networks (DNN), Convolutional Neural Network (CNN), Recurrent Neural Network (RNN), Restricted Boltzmann Machine (RBM), Deep Belief Network (DBN), Bidirectional Recurrent Deep Neural Network (BRDNN), Deep Q-network, or a combination of two or more of the above networks. The artificial intelligence model may additionally or alternatively include a software structure in addition to the hardware structure.

The memory 430 may store various data used by at least one element (e.g., the processor 420 or the sensor module 476) of the electronic apparatus 401. The data may include, for example, software (e.g., the program 440) and input data or output data about commands related thereto. The memory 430 may include a volatile memory 432 or a nonvolatile memory 434.

The program 440 may be stored as software in the memory 430 and may include, for example, an operating system 442, middleware 444, or an application 446.

The input module 450 may receive a command or data to be used by an element (e.g., the processor 420) of the electronic apparatus 401, from the outside (e.g., the user) of the electronic apparatus 401. The input module 450 may include, for example, a microphone, a mouse, a keyboard, a key (e.g., a button), or a digital pen (e.g., a stylus pen).

The audio output module 455 may output an audio signal to the outside of the electronic apparatus 401. The audio output module 455 may include, for example, a speaker or a receiver. The speaker may be used for general purposes such as multimedia playback or recording playback. The receiver may be used to receive incoming calls. According to an embodiment of the disclosure, the receiver may be implemented separately from or as a portion of the speaker.

The display module 460 may visually provide information to the outside (e.g., the user) of the electronic apparatus 401. The display module 460 may include, for example, a display, a hologram device, or a projector, and a control circuit for controlling the corresponding device. According to an embodiment of the disclosure, the display module 460 may include a touch sensor set to detect a touch or a pressure sensor set to measure the strength of a force generated by the touch.

The audio module 470 may convert a sound into an electric signal or convert an electric signal into a sound. According to an embodiment of the disclosure, the audio module 470 may obtain a sound through the input module 450 or may output a sound through the audio output module 455 or an external electronic apparatus (e.g., the electronic apparatus 402) (e.g., a speaker or a headphone) directly or wirelessly connected to the electronic apparatus 401.

The sensor module 476 may detect an operating state (e.g., power or temperature) of the electronic apparatus 401 or an external environmental state (e.g., user state) and generate an electrical signal or data value corresponding to the detected state. According to an embodiment of the disclosure, the sensor module 476 may include, for example, a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor.

The interface 477 may support one or more designated protocols that may be used by the electronic apparatus 401 to be directly or wirelessly connected to an external electronic apparatus (e.g., the electronic apparatus 402). According to an embodiment of the disclosure, the interface 477 may include, for example, a high definition multimedia interface (HDMI), a universal serial bus (USB) interface, a secure digital (SD) card interface, or an audio interface.

The connection terminal 478 may include a connector through which the electronic apparatus 401 may be physically connected to an external electronic apparatus (e.g., the electronic apparatus 402). According to an embodiment of the disclosure, the connection terminal 478 may include, for example, an HDMI connector, a USB connector, an SD card connector, or an audio connector (e.g., a headphone connector).

The haptic module 479 may convert an electrical signal into a mechanical stimulus (e.g., vibration or movement) or an electrical stimulus that the user may recognize through a haptic or kinesthetic sense. According to an embodiment of the disclosure, the haptic module 479 may include, for example, a motor, a piezoelectric device, or an electrical stimulation device.

The camera module 480 may capture still images and moving images. According to an embodiment of the disclosure, the camera module 480 may include one or more lenses, image sensors, image signal processors, or flashes.

The power management module 488 may manage power supplied to the electronic apparatus 401. According to an embodiment of the disclosure, the power management module 488 may be implemented as, for example, at least a portion of a power management integrated circuit (PMIC).

The battery 489 may supply power to at least one element of the electronic apparatus 401. According to an embodiment of the disclosure, the battery 489 may include, for example, a non-rechargeable primary cell, a rechargeable secondary cell, or a fuel cell.

The communication module 490 may support establishment of a direct (e.g., wired) communication channel or a wireless communication channel between the electronic apparatus 401 and an external electronic apparatus (e.g., the electronic apparatus 402, the electronic apparatus 404, or the server 408) and performance of communication through an established communication channel. The communication module 490 may include one or more communication processors that operate independently of the processor 420 (e.g., an application processor) and support direct (e.g., wired) communication or wireless communication. According to an embodiment of the disclosure, the communication module 490 may include a wireless communication module 492 (e.g., a cellular communication module, a short-range communication module, or a global navigation satellite system (GNSS) communication module) or a wired communication module 494 (e.g., a local area network (LAN) communication module or a power line communication module). The corresponding communication module among these communication modules may communicate with the external electronic apparatus 404 through a first network 498 (e.g., a short-range communication network such as Bluetooth, wireless fidelity (WiFi) direct, or infrared data association (IrDA)) or a second network 499 (e.g., a long-range communication network such as a legacy cellular network, a 5G network, a next-generation communication network, the Internet, or a computer network (e.g., LAN or WAN)). These various types of communication modules may be integrated into one element (e.g., a single chip) or may be implemented as a plurality of components (e.g., multiple chips) that separate from each other. The wireless communication module 492 may identify or authenticate the electronic apparatus 401 in a communication network such as the first network 498 or the second network 499 by using subscriber information (e.g., International Mobile Subscriber Identifier (IMSI)) stored in the subscriber identification module 496.

The wireless communication module 492 may support a 5G network after a 4G network and a next-generation communication technology, for example, a new radio (NR) access technology. The NR access technology may support high-speed transmission of high-capacity data (enhanced mobile broadband (eMBB)), minimization of terminal power and access of multiple terminals (massive machine type communications (mMTC)), or ultra-reliable and low-latency communications (URLLC). The wireless communication module 492 may support, for example, a high frequency band (e.g., an mmWave band) to achieve a high data rate. The wireless communication module 492 may support various technologies for securing performance in a high frequency band, for example, technologies such as beam-forming, massive multiple-input and multiple-output (MIMO), full dimensional MIMO (FD-MIMO), array antenna, analog beam-forming, or large scale antenna. The wireless communication module 492 may support various requirements prescribed in the electronic apparatus 401, the external electronic apparatus (e.g., the electronic apparatus 404), or the network system (e.g., the second network 499). According to an embodiment of the disclosure, the wireless communication module 492 may support a peak data rate (e.g., 20 Gbps or more) for realizing eMBB, a loss coverage (e.g., 164 dB or less) for realizing mMTC, or a U-plane latency (e.g., 0.5 ms or less in each of downlink (DL) and uplink (UL) or a round trip of 1 ms or less) for realizing URLLC.

The antenna module 497 may transmit/receive a signal or power to/from the outside (e.g., the external electronic apparatus). According to an embodiment of the disclosure, the antenna module 497 may include an antenna including a conductor formed on a substrate (e.g., a PCB) or a radiator including a conductive pattern. According to an embodiment of the disclosure, the antenna module 497 may include a plurality of antennas (e.g., an array antenna). In this case, at least one antenna suitable for a communication scheme used in a communication network such as the first network 498 or the second network 499 may be selected from among the plurality of antennas by, for example, the communication module 490. The signal or power may be transmitted or received between the communication module 490 and the external electronic apparatus through the selected at least one antenna. According to some embodiments of the disclosure, other components (e.g., a radio frequency integrated circuit (RFIC)) other than the radiator may be additionally formed as a portion of the antenna module 497.

According to certain embodiments of the disclosure, the antenna module 497 may form an mmWave antenna module. According to an embodiment of the disclosure, the mmWave antenna module may include a printed circuit board, an RFIC arranged on or adjacent to a first surface (e.g., bottom surface) of the printed circuit board and capable of supporting a designated high frequency band (e.g., a mmWave band), and a plurality of antennas (e.g., an array antenna) arranged on or adjacent to a second surface (e.g., top or side surface) of the printed circuit board and capable of transmitting or receiving signals of the designated high frequency band.

At least some of the above elements may be connected to each other through a communication scheme between peripheral devices (e.g., bus, general-purpose input and output (GPIO), serial peripheral interface (SPI), or mobile industry processor interface (MIPI)) and may exchange signals (e.g., command or data) with each other.

According to an embodiment of the disclosure, the command or data may be transmitted or received between the electronic apparatus 401 and the external electronic apparatus 404 through the server 408 connected to the second network 499. Each of the external electronic apparatuses 402 and 404 may be the same as or different from the electronic apparatus 401. According to an embodiment of the disclosure, all or some of the operations executed by the electronic apparatus 401 may be executed by one or more external electronic apparatuses among the external electronic apparatuses 402, 404, and 408. For example, when the electronic apparatus 401 needs to perform a function or service automatically or in response to a request from the user or another device, the electronic apparatus 401 may request one or more external electronic apparatuses to perform at least a portion of the function or service additionally or instead of executing the function or service by itself. One or more external electronic apparatuses that have received the request may execute at least a portion of the requested function or service or an additional function or service related to the request and transmit the execution result thereof to the electronic apparatus 401. The electronic apparatus 401 may process the execution result additionally or as it is and provide the processing result thereof as at least a portion of a response to the request. For this purpose, for example, cloud computing, distributed computing, mobile edge computing, or client-server computing technology may be used. The electronic apparatus 401 may provide an ultra-low-latency service by using, for example, distributed computing or mobile edge computing. In another embodiment, the external electronic apparatus 404 may include an Internet of things (IoT) device. The server 408 may be an intelligent server using machine learning and/or neural networks. According to an embodiment of the disclosure, the external electronic apparatus 404 or the server 408 may be included in the second network 499. The electronic apparatus 401 may be applied to an intelligent service (e.g., smart home, smart city, smart car, or health care) based on 5G communication technology and IoT-related technology.

FIG. 18 is a block diagram 500 of the camera module 480 according to an embodiment of the disclosure. Referring to FIG. 18, the camera module 480 may include a lens assembly 510, a flash 520, an image sensor 530, an image stabilizer 540, a memory 550 (e.g., a buffer memory), or an image signal processor 560. The lens assembly 510 may collect light emitted from an object whose image is to be captured. The lens assembly 510 may include one or more lenses. The embodiments described with reference to FIGS. 1 to 24 may be applied to the lens assembly 510. According to an embodiment of the disclosure, the camera module 480 may include a plurality of lens assemblies 510. In this case, the camera module 480 may form, for example, a dual camera, a 360 degree camera, or a spherical camera. Some of the plurality of lens assemblies 510 may have the same lens properties (e.g., viewing angle, focal length, auto focus, f number, or optical zoom), or at least one lens assembly may have one or more lens properties that are different from the lens properties of other lens assemblies. The lens assembly 510 may include, for example, a wide-angle lens or a telephoto lens.

The flash 520 may emit light used to enhance light emitted or reflected from the object. According to an embodiment of the disclosure, the flash 520 may include one or more light emitting diodes (e.g., a red-green-blue (RGB) LED, a white LED, an infrared LED, or an ultraviolet LED) or a xenon lamp. The image sensor 530 may obtain an image corresponding to the object by converting light emitted or reflected from the object and transmitted through the lens assembly 510 into an electrical signal. According to an embodiment of the disclosure, the image sensor 530 may include, for example, one image sensor selected from among image sensors (e.g., an RGB sensor, a black and white (BW) sensor, an IR sensor, or a UV sensor) having different properties, a plurality of image sensors having the same properties, or a plurality of image sensors having different properties. Each image sensor included in the image sensor 530 may be implemented by using, for example, a charged coupled device (CCD) sensor or a complementary metal oxide semiconductor (CMOS) sensor.

The image stabilizer 540 may move at least one lens or image sensor 530 included in the lens assembly 510 in a particular direction or control operation characteristics of the image sensor 530 (e.g., adjustment of read-out timing), in response to the movement of the camera module 480 or the electronic apparatus 401 including the same. This may compensate for at least some of the adverse effects of the movement on the captured image. According to an embodiment of the disclosure, the image stabilizer 540 may detect such a movement of the camera module 480 or the electronic apparatus 401 by using a gyro sensor (not illustrated) or an acceleration sensor (not illustrated) arranged inside or outside the camera module 480. According to an embodiment of the disclosure, the image stabilizer 540 may be implemented as, for example, an optical image stabilizer. The memory 550 may temporarily store at least a portion of the image obtained through the image sensor 530 for the next image processing operation. For example, when image obtainment is delayed according to the shutter or a plurality of images are obtained at high speed, an obtained original image (e.g., Bayer-patterned image or high-resolution image) may be stored in the memory 550 and a copy image (e.g., a low-resolution image) corresponding thereto may be previewed through the display module 460. Thereafter, when a designated expression is satisfied (e.g., a user input or a system command), at least a portion of the original image stored in the memory 550 may be obtained and processed by, for example, the image signal processor 560. According to an embodiment of the disclosure, as at least a portion of the memory 430, the memory 550 may be configured as a separate memory operated independently of the memory 430.

The image signal processor 560 may perform one or more image processing on the image obtained through the image sensor 530 or on the image stored in the memory 550. The one or more image processing may include, for example, depth map generation, 3D modeling, panorama generation, feature point extraction, image synthesis, or image compensation (e.g., noise reduction, resolution adjustment, brightness adjustment, blurring, sharpening, or softening). Additionally or alternatively, the image signal processor 560 may perform control (e.g., exposure time control or readout timing control) on at least one (e.g., the image sensor 530) of the elements included in the camera module 480. The image processed by the image signal processor 560 may be stored back in the memory 550 for further processing or may be provided to the external element (e.g., the memory 430, the display module 460, the electronic apparatus 402, the electronic apparatus 404, or the server 408) of the camera module 480. According to an embodiment of the disclosure, the image signal processor 560 may be configured as at least a portion of the processor 420 or as a separate processor operated independently of the processor 420. When the image signal processor 560 is configured as a separate processor from the processor 420, at least one image processed by the image signal processor 560 may be displayed through the display module 460 as it is or after additional image processing by the processor 420.

According to an embodiment of the disclosure, the electronic apparatus 401 may include a plurality of camera modules 480 having different properties or functions. In this case, for example, at least one of the plurality of camera modules 480 may be a wide-angle camera, and at least another one may be a telephoto camera. Similarly, at least one of the plurality of camera modules 480 may be a front camera, and at least another one may be a rear camera.

According to an embodiment of the disclosure, a lens assembly including four or more lenses arranged from an object side to an image side where an image sensor is located may include a first lens arranged closest to the object side, having positive refractive power, including an object-side surface convex toward the object side, and being an aspherical lens; a last lens arranged closest to the image side; and two or more plastic aspherical lenses disposed between the first lens and the last lens and may satisfy the following expression:

$$FOV<8 \text{ (degree)} \qquad \text{<Expression>}$$

Here, FOV denotes a half viewing angle of the lens assembly.

The lens assembly may satisfy the following expression:

$$0.7<(L/FOV)<3.4 \qquad \text{<Expression>}$$

Here, L denotes the distance from the object-side surface of the first lens to the image-side surface of the last lens.

The lens assembly may satisfy the following expression:

$$L1R1/EFL<0.4 \qquad \text{<Expression>}$$

Here, L1R1 denotes a curvature radius of the object-side surface of the first lens, and EFL denotes a focal length (focal distance) of the lens assembly.

The lens assembly may satisfy the following expression:

$$2<(BFL/FOV)<7 \qquad \text{<Expression>}$$

Here, BFL denotes a back focal length of the lens assembly.

The lens assembly may be configured such that the distance between the first lens and the last lens may be fixed during focusing.

The lens assembly may be configured such that all lenses included in the lens assembly may move together to perform focusing.

A reflection member may be further arranged between the object side and the first lens.

The reflection member may be configured to move to perform focusing.

A reflection member may be further arranged between the last lens and the image side.

A second lens having positive refractive power and a third lens having negative refractive power may be arranged between the first lens and the last lens.

Each of the second lens and the third lens may be an aspherical lens.

The second lens may be a biconvex lens.

The third lens may be a biconcave lens.

The first lens may be a biconvex lens.

According to an embodiment of the disclosure, an electronic apparatus may include: a lens assembly including four or more lenses arranged from an object side to an image side where an image sensor is located; at least one camera configured to obtain information about an object from light incident through the lens assembly; and an image signal processor configured to process an image of the object based on the information, wherein the lens assembly may include a first lens arranged closest to the object side, having positive refractive power, including an object-side surface convex toward the object side, and being an aspherical lens, a last lens arranged closest to the image side, and two or more plastic aspherical lenses disposed between the first lens and the last lens and may satisfy the following expression:

$$FOV<8 \text{ (degree)} \qquad \text{<Expression>}$$

Here, FOV denotes a half viewing angle of the lens assembly.

The embodiments described herein should be considered in a descriptive sense only and not for purposes of limitation. Therefore, the scope of the disclosure should be interpreted as including all modifications or various other embodiments based on the technical concept of the disclosure. The above embodiments are merely examples, and those of ordinary skill in the art may derive various modifications and other equivalent embodiments therefrom. Thus, the spirit and scope of the disclosure should be defined by the technical concept of the disclosure defined in the following claims.

The invention claimed is:

1. A telephoto lens assembly including four or more lenses arranged from an object side to an image side where an image sensor is located, the lens assembly comprising:
   a first lens arranged closest to the object side, having positive refractive power, including an object-side surface convex toward the object side, and being an aspherical lens;
   a last lens arranged closest to the image side; and
   two or more plastic aspherical lenses disposed between the first lens and the last lens,
   wherein the lens assembly satisfies the following expression:

$$FOV<8 \text{ degree}$$

$$2<(BFL/FOV)<7 \text{ mm/degree}$$

wherein FOV denotes a half viewing angle of the telephoto lens assembly and BFL denotes a back focal length of the lens assembly, and
   wherein the lens assembly satisfies a following expression:

$$0.7<(L/FOV)<3.4 \text{ mm/degree}$$

wherein L denotes a distance from the object-side surface of the first lens to an image-side surface of the last lens.

2. The lens assembly of claim 1, wherein the lens assembly satisfies a following expression:

$$L1R1/EFL<0.4$$

wherein L1R1 denotes a curvature radius of the object-side surface of the first lens, and EFL denotes a focal length of the lens assembly.

3. The lens assembly of claim 1, wherein the lens assembly is configured such that a distance between the first lens and the last lens is fixed during focusing.

4. The lens assembly of claim 1, wherein the lens assembly is configured such that all lenses included in the lens assembly move together to perform focusing.

5. The lens assembly of claim 1, wherein a reflection member is further arranged between the object side and the first lens.

6. The lens assembly of claim 5, wherein the reflection member is configured to move to perform focusing.

7. The lens assembly of claim 1, wherein a reflection member is further arranged between the last lens and the image side.

8. The lens assembly of claim 1, wherein a second lens having positive refractive power and a third lens having negative refractive power are arranged between the first lens and the last lens.

9. The lens assembly of claim 8, wherein each of the second lens and the third lens is an aspherical lens.

10. The lens assembly of claim 8, wherein the second lens is a biconvex lens.

11. The lens assembly of claim 8, wherein the third lens is a biconcave lens.

12. The lens assembly of claim 1, wherein the first lens is a biconvex lens.

13. An electronic apparatus comprising:
a telephoto lens assembly including four or more lenses arranged from an object side to an image side where an image sensor is located;
at least one camera configured to obtain information about an object from light incident through the lens assembly; and
an image signal processor configured to process an image of the object based on the information,
wherein the lens assembly includes a first lens arranged closest to the object side, having positive refractive power, including an object-side surface convex toward the object side, and being an aspherical lens, a last lens arranged closest to the image side, and two or more plastic aspherical lenses disposed between the first lens and the last lens,
wherein the lens assembly satisfies the following expression:

$$FOV < 8 \text{ degrees}$$

$$2 < (BFL/FOV) < 7 \text{ mm/degree}$$

wherein FOV denotes a half viewing angle of the telephoto lens assembly and BFL denotes a back focal length of the lens assembly, wherein the back focal length is the distance from the image side surface of the last lens and an image plane, and
wherein the lens assembly satisfies a following expression:

$$0.7 < (L/FOV) < 3.4 \text{ mm/degree}$$

wherein L denotes a distance from the object-side surface of the first lens to an image-side surface of the last lens.

14. The electronic apparatus of claim 13, wherein the lens assembly satisfies a following expression:

$$L1R1/EFL < 0.4$$

wherein L1R1 denotes a curvature radius of the object-side surface of the first lens, and EFL denotes a focal length of the lens assembly.

15. The electronic apparatus of claim 13, wherein the lens assembly is configured such that a distance between the first lens and the last lens is fixed during focusing.

16. The lens assembly of claim 1, wherein the first lens, the last lens, and the two or more plastic aspherical lenses move together.

* * * * *